Jan. 2, 1940.　　　U. HUTCHINSON　　　2,185,895
ELECTRICALLY CONTROLLED SELECTIVE DISPLAY APPARATUS
Filed May 29, 1939　　　17 Sheets-Sheet 1
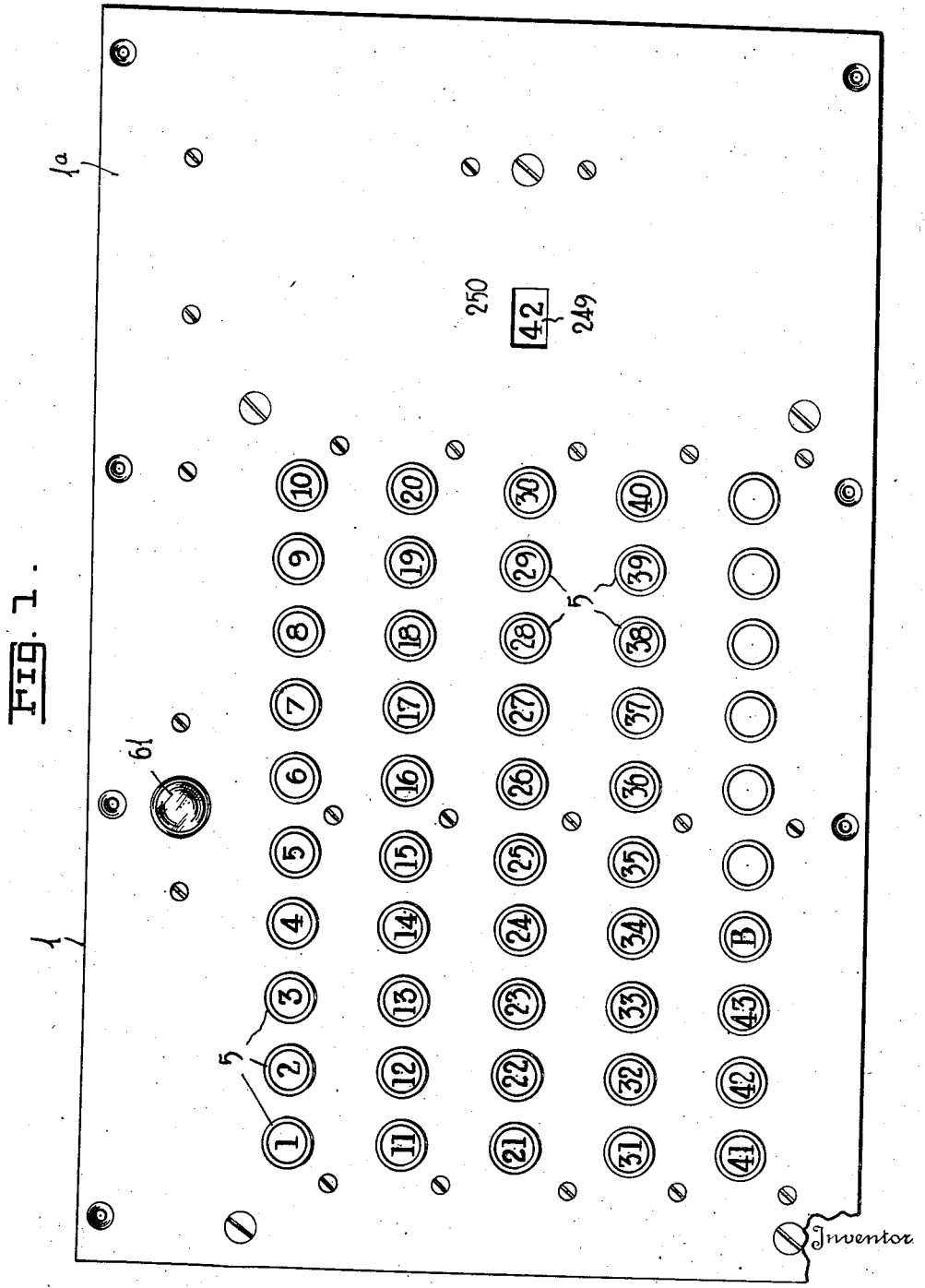
Inventor
Uriah Hutchinson,
By Stone, Boyden & Mack,
Attorneys Jan. 2, 1940.　　　U. HUTCHINSON　　　2,185,895
ELECTRICALLY CONTROLLED SELECTIVE DISPLAY APPARATUS
Filed May 29, 1939　　　17 Sheets-Sheet 2
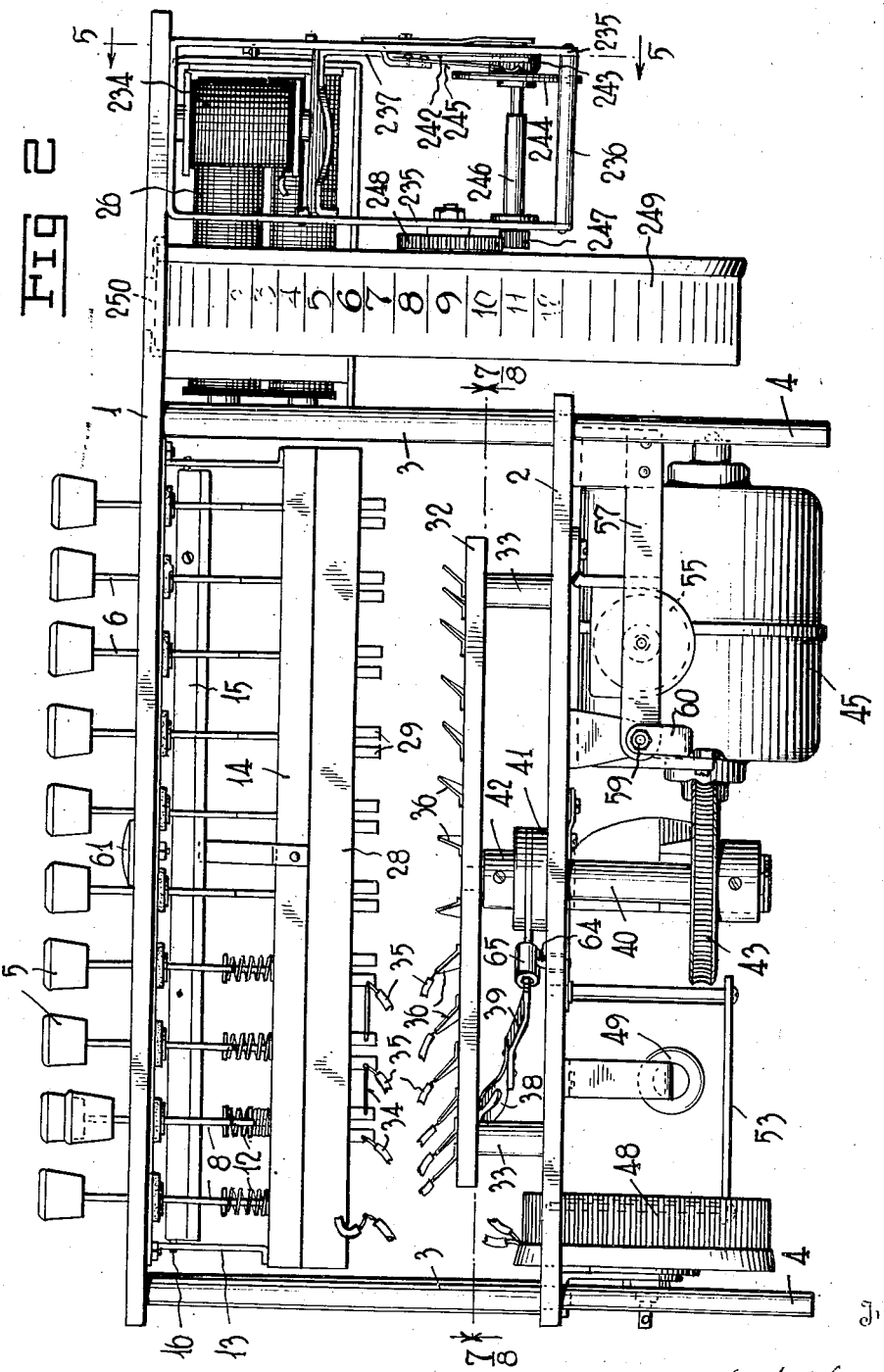
Inventor
Uriah Hutchinson,
By Stone, Boyden & Mack,
Attorneys.

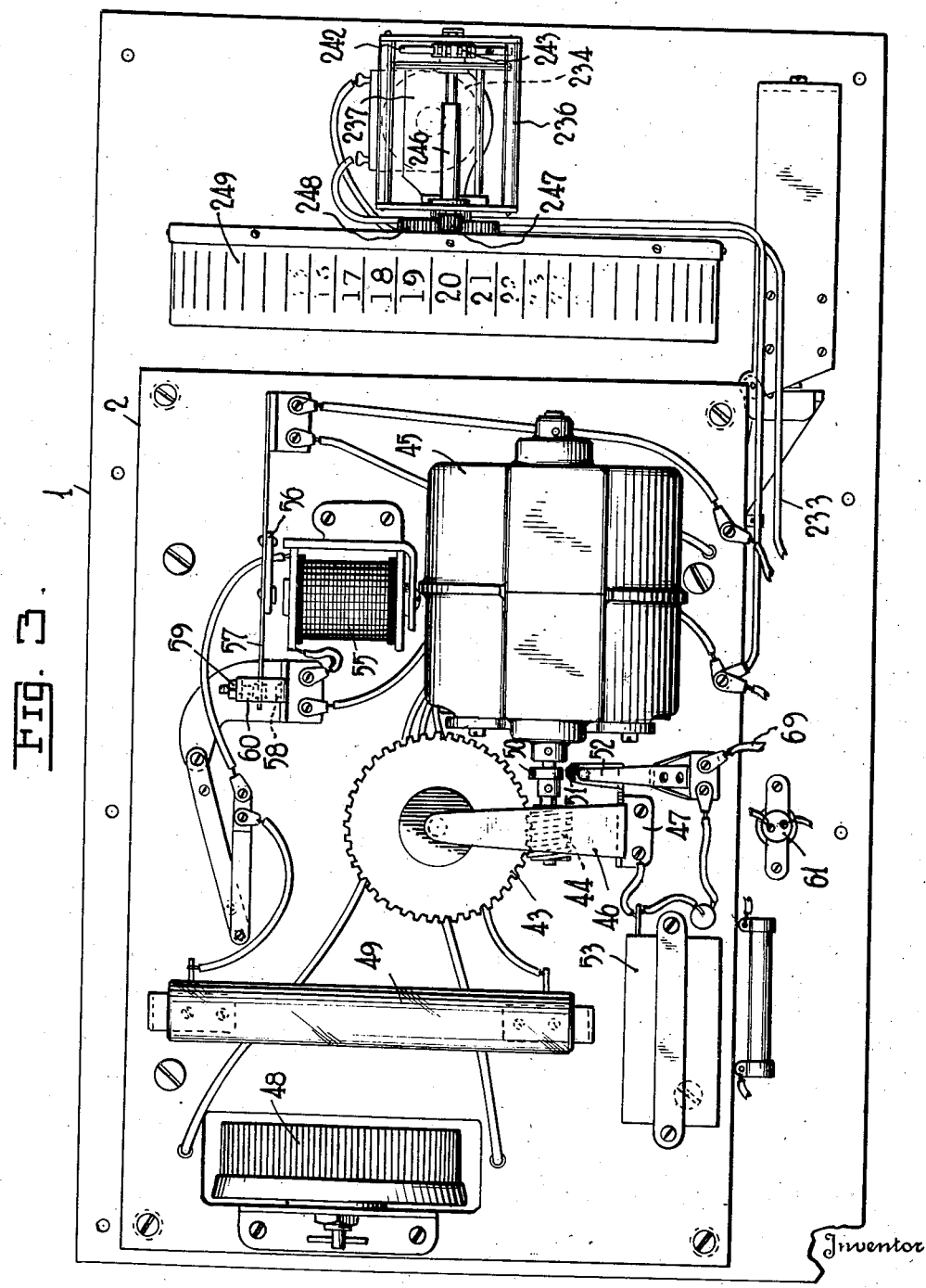

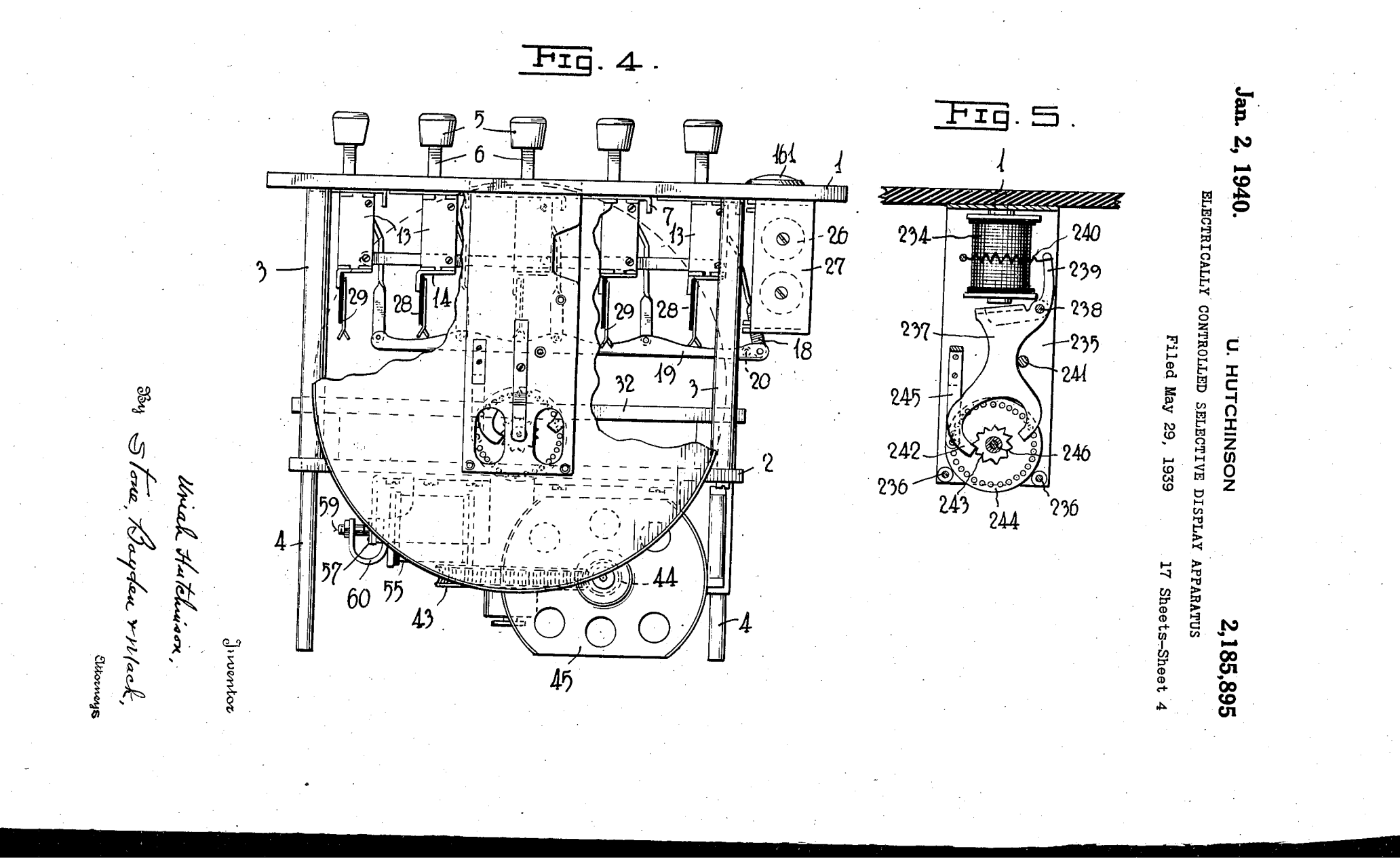

Jan. 2, 1940.   U. HUTCHINSON   2,185,895
ELECTRICALLY CONTROLLED SELECTIVE DISPLAY APPARATUS
Filed May 29, 1939   17 Sheets-Sheet 4

Inventor
Uriah Hutchinson,
By Stone, Boyden & Mack,
Attorneys

Jan. 2, 1940.  U. HUTCHINSON  2,185,895

ELECTRICALLY CONTROLLED SELECTIVE DISPLAY APPARATUS

Filed May 29, 1939  17 Sheets-Sheet 5

Inventor
Uriah Hutchinson,
By Stone, Boyden & Mack,
Attorneys.

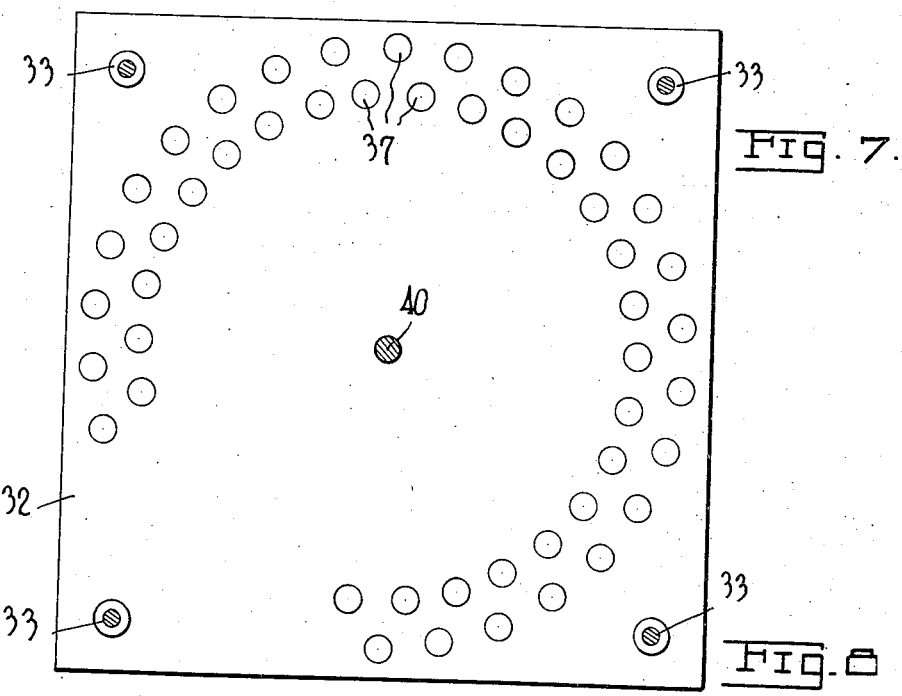
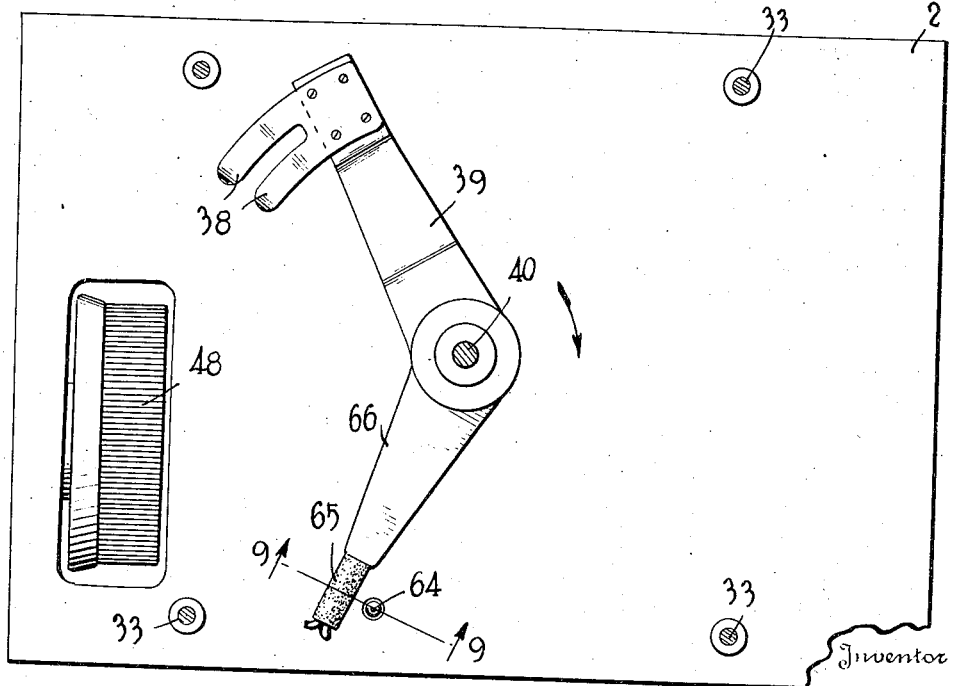
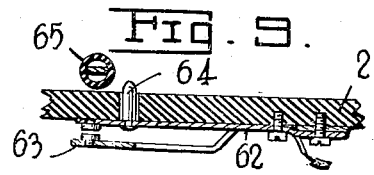

Jan. 2, 1940. U. HUTCHINSON 2,185,895
ELECTRICALLY CONTROLLED SELECTIVE DISPLAY APPARATUS
Filed May 29, 1939 17 Sheets-Sheet 7
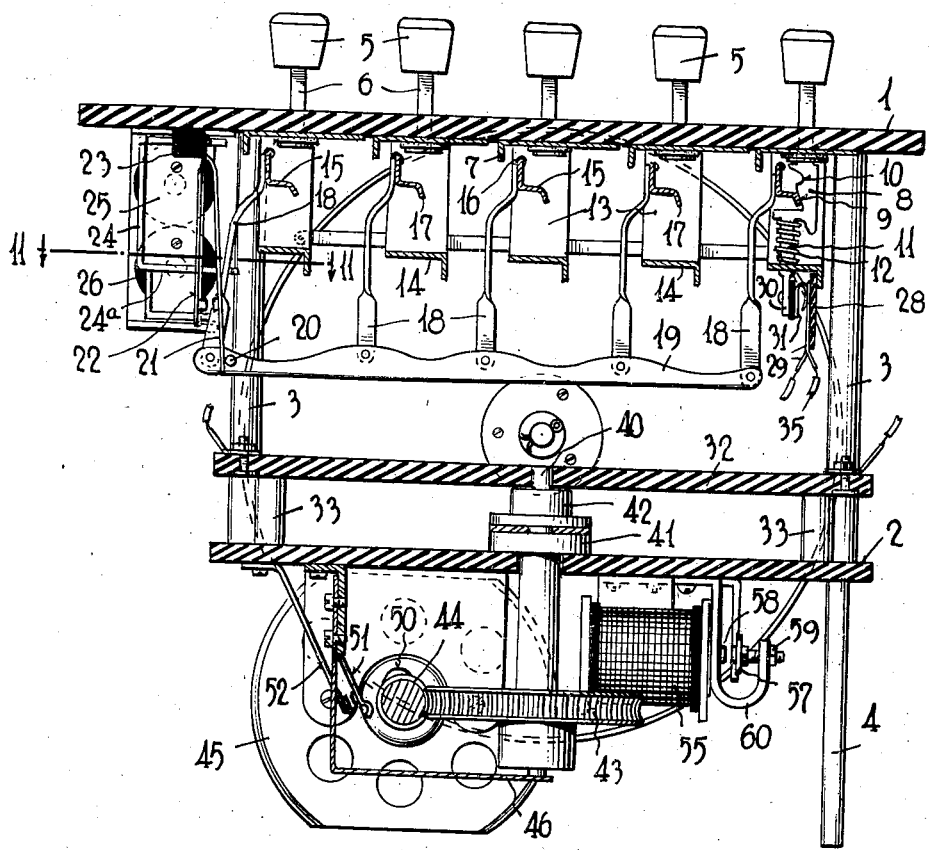
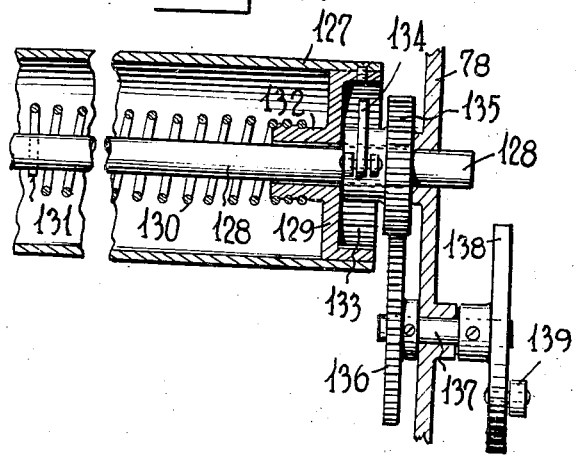
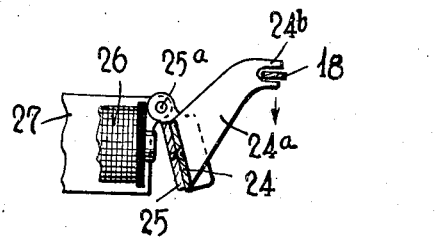
Inventor
Uriah Hutchinson,
By Stone, Boyden & Mack,
Attorneys Jan. 2, 1940.   U. HUTCHINSON   2,185,895
ELECTRICALLY CONTROLLED SELECTIVE DISPLAY APPARATUS
Filed May 29, 1939   17 Sheets-Sheet 8
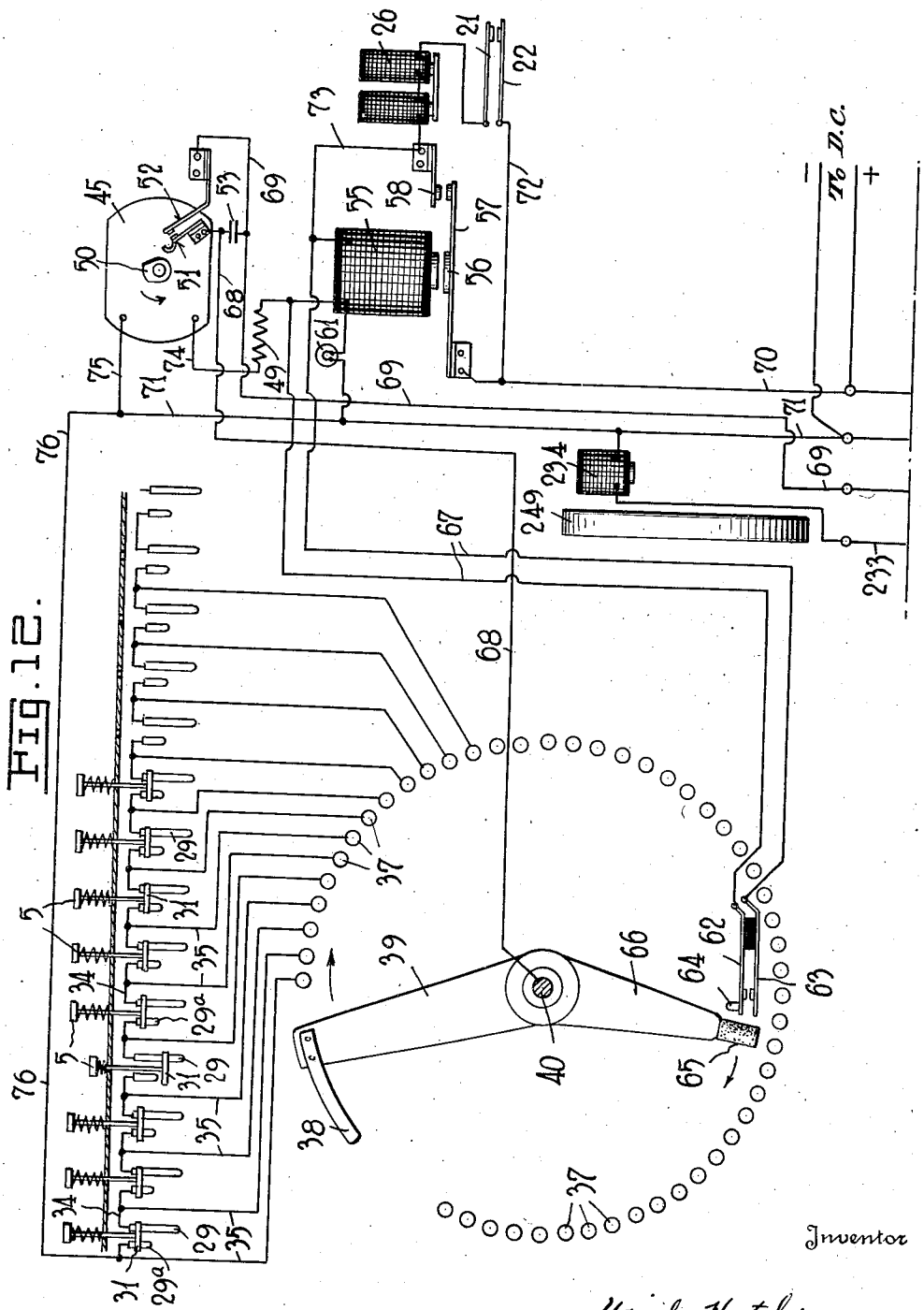
Inventor
Uriah Hutchinson,
By Stone, Boyden & Mack.
Attorneys Jan. 2, 1940. U. HUTCHINSON 2,185,895
ELECTRICALLY CONTROLLED SELECTIVE DISPLAY APPARATUS
Filed May 29, 1939 17 Sheets-Sheet 9
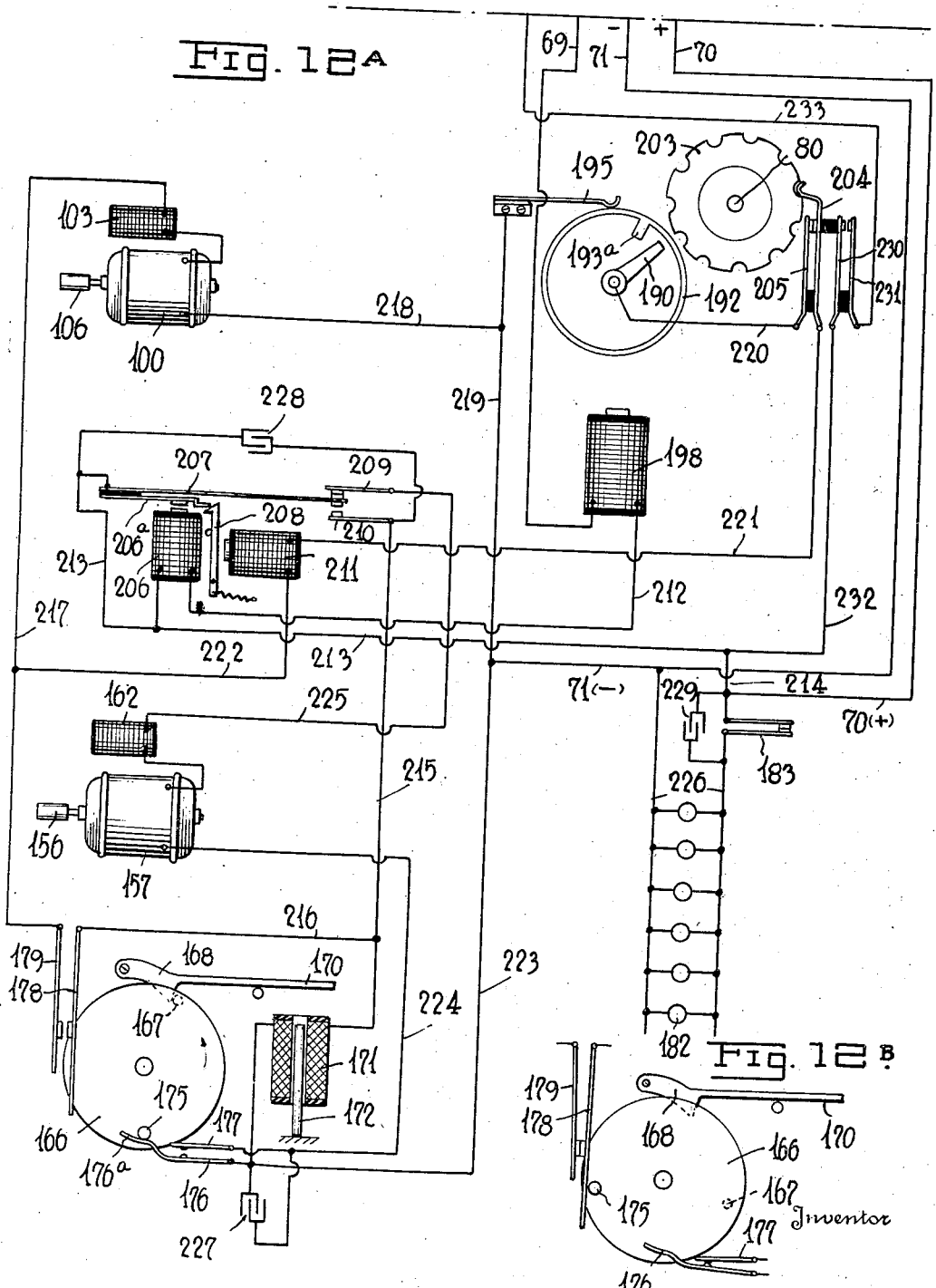
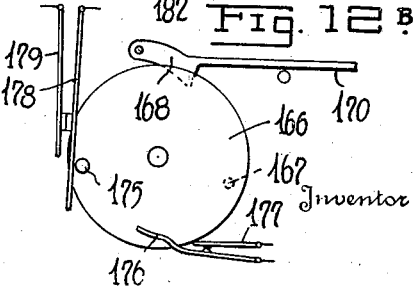
Inventor
Uriah Hutchinson,
By Stone, Boyden & Mack,
Attorneys

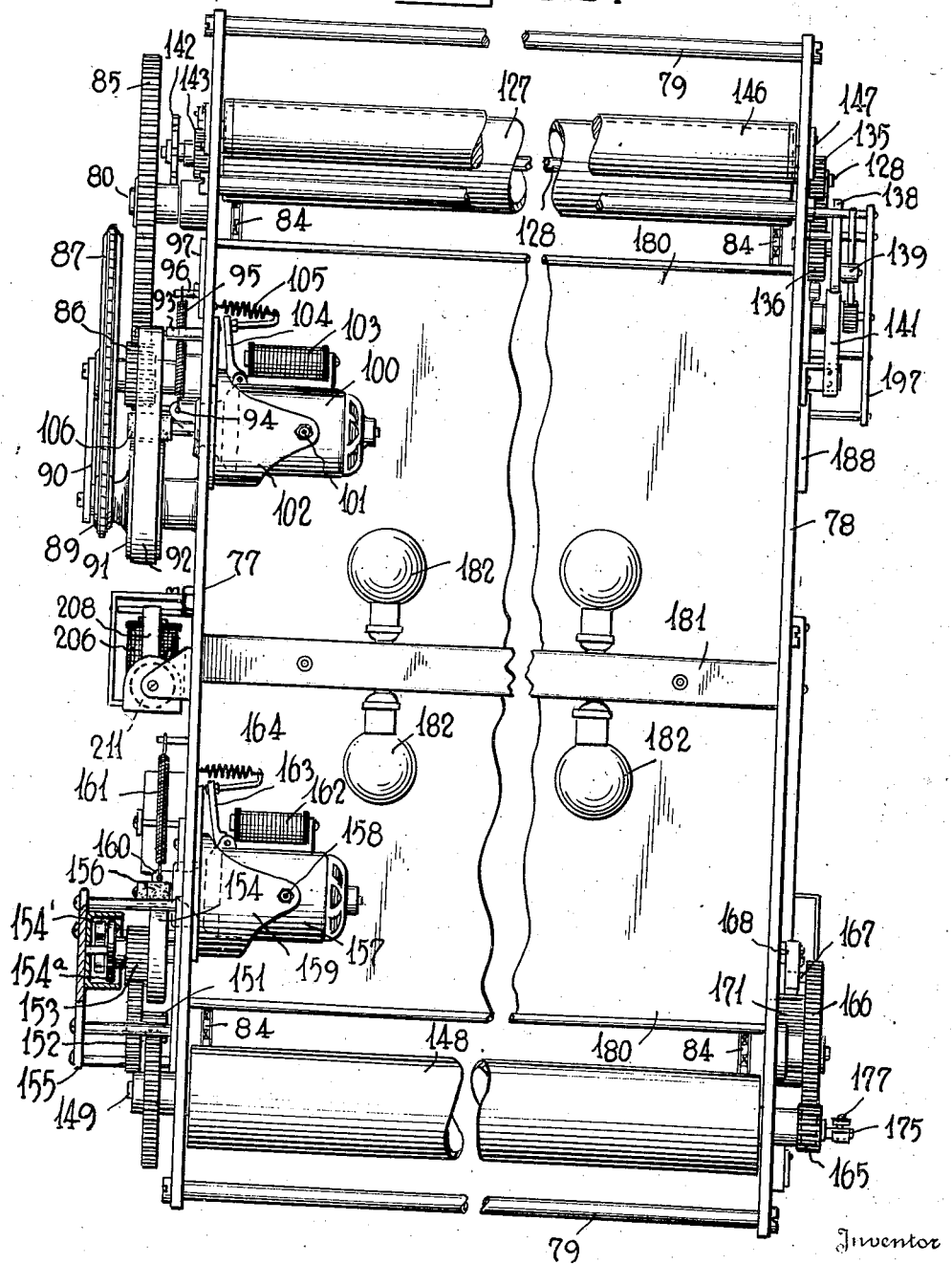

Jan. 2, 1940. U. HUTCHINSON 2,185,895
ELECTRICALLY CONTROLLED SELECTIVE DISPLAY APPARATUS
Filed May 29, 1939 17 Sheets-Sheet 11
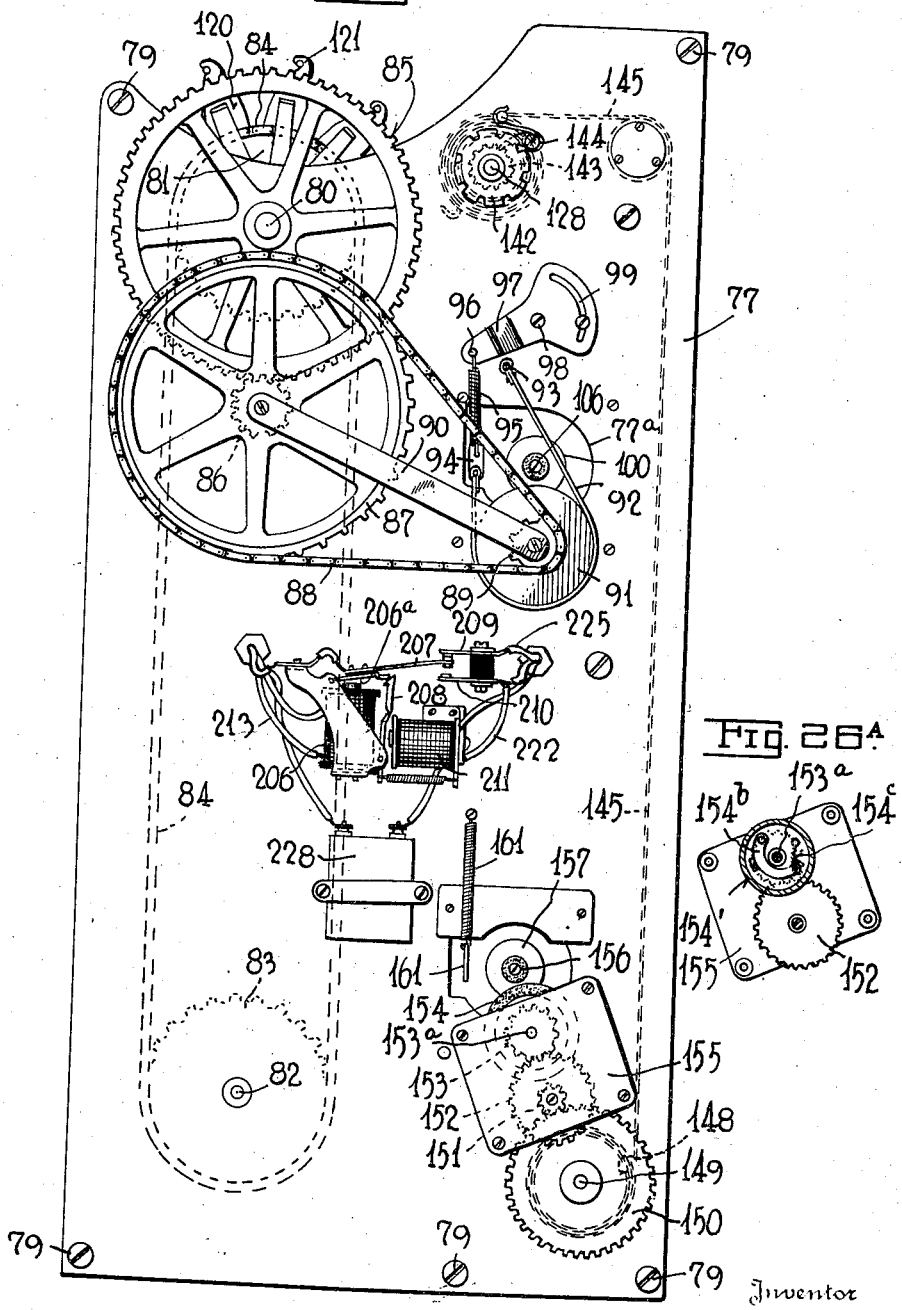
Fig. 14
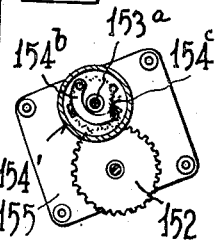
Fig. 26ᴬ
Inventor
Uriah Hutchinson,
By Stone, Boyden & Mack,
Attorneys Jan. 2, 1940.  U. HUTCHINSON  2,185,895
ELECTRICALLY CONTROLLED SELECTIVE DISPLAY APPARATUS
Filed May 29, 1939  17 Sheets-Sheet 12

Inventor
Uriah Hutchinson,
By Stone, Boyden & Mack,
Attorneys

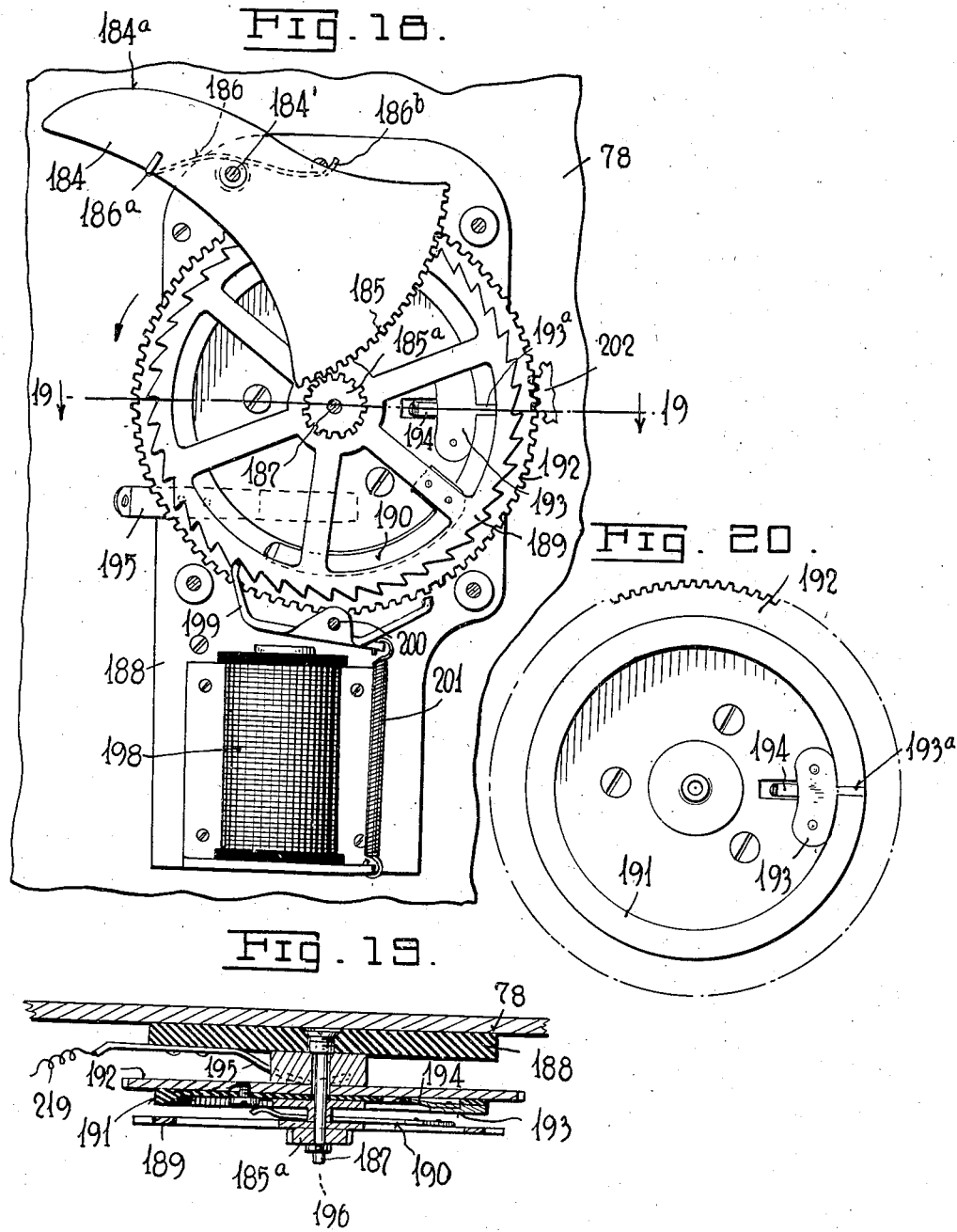

Jan. 2, 1940. U. HUTCHINSON 2,185,895
ELECTRICALLY CONTROLLED SELECTIVE DISPLAY APPARATUS
Filed May 29, 1939 17 Sheets-Sheet 14
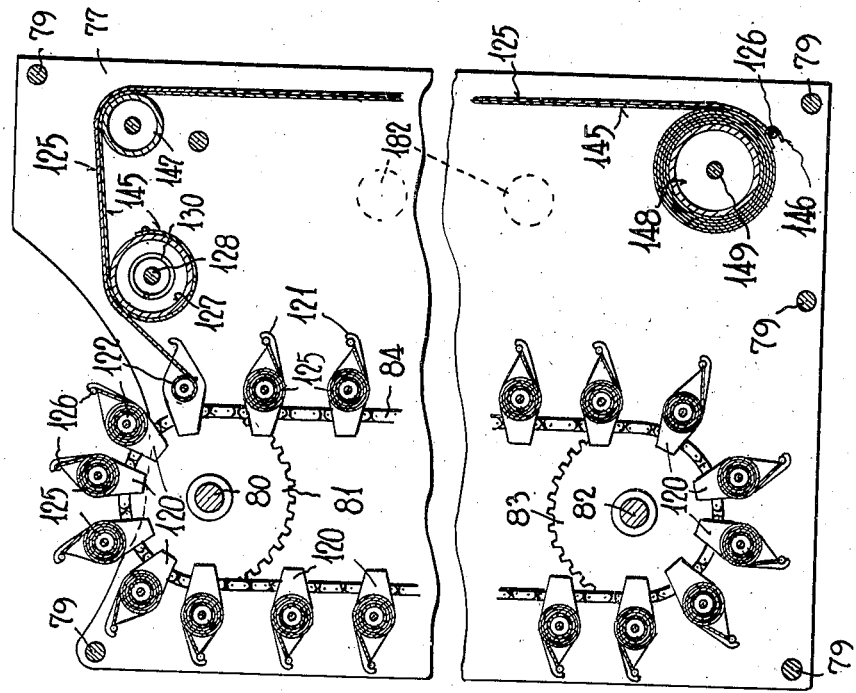
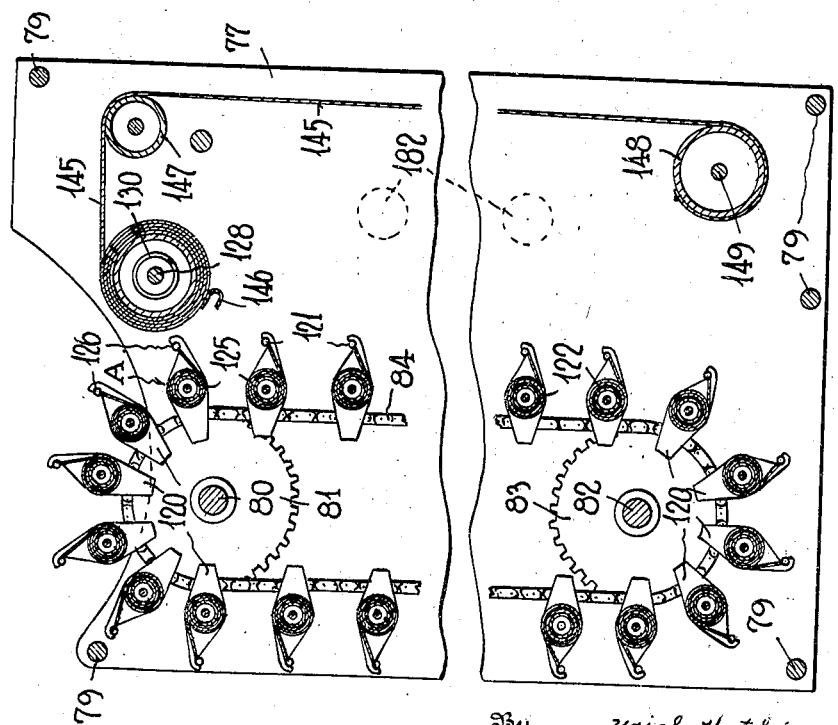
Inventor
Uriah Hutchinson,
By Stone, Boyden & Mack,
Attorneys

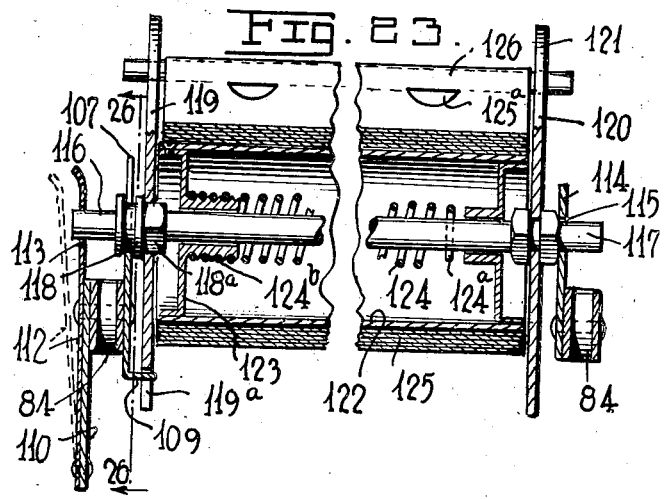

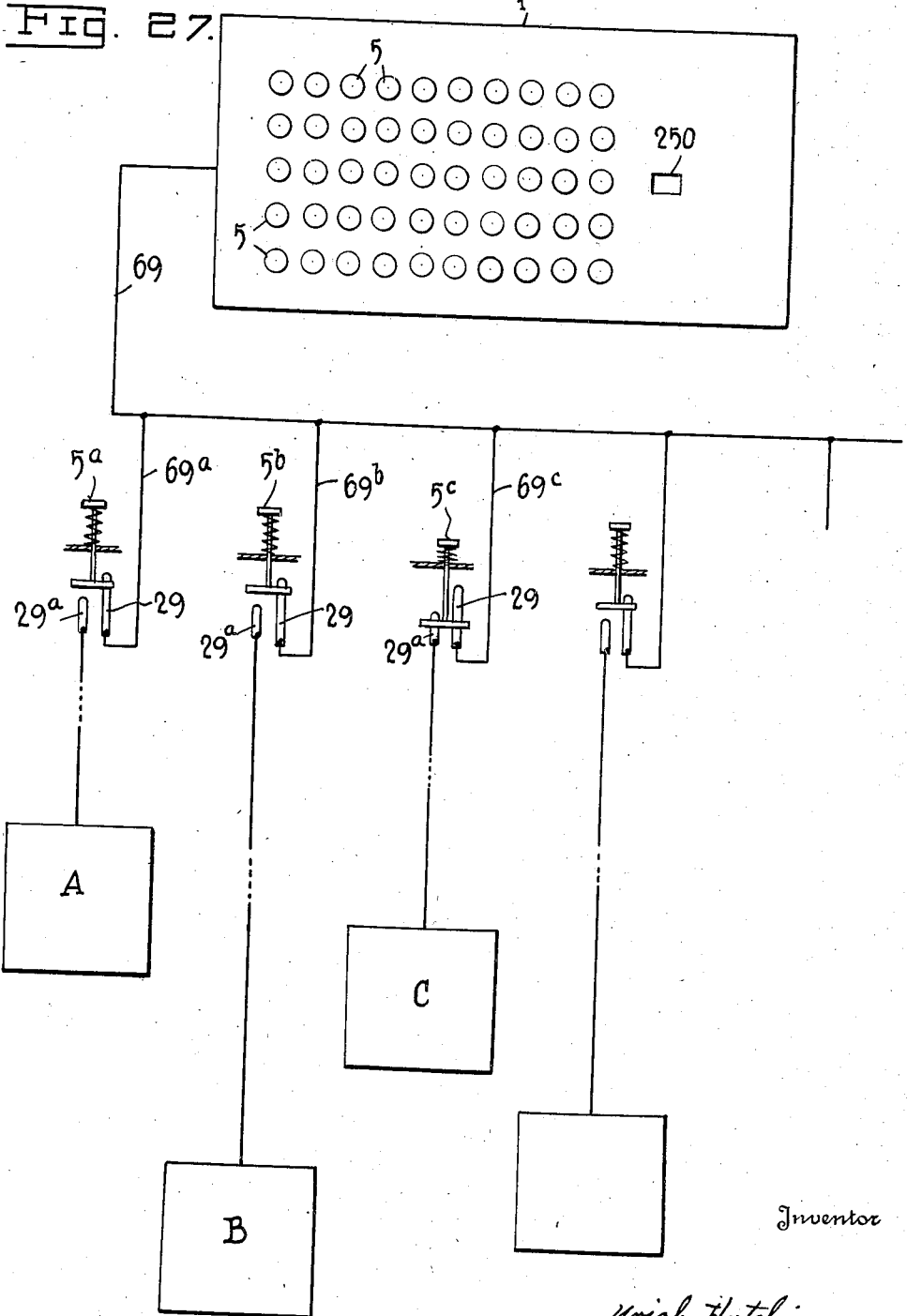

Jan. 2, 1940.                    U. HUTCHINSON                    2,185,895
            ELECTRICALLY CONTROLLED SELECTIVE DISPLAY APPARATUS
                     Filed May 29, 1939         17 Sheets-Sheet 17

Inventor
Uriah Hutchinson,
By Stone, Boyden & Mack,
            Attorneys

Patented Jan. 2, 1940

2,185,895

UNITED STATES PATENT OFFICE 2,185,895

ELECTRICALLY CONTROLLED SELECTIVE DISPLAY APPARATUS

Uriah Hutchinson, New York, N. Y.

Application May 29, 1939, Serial No. 276,480

26 Claims. (Cl. 40—84)

This invention relates to apparatus for displaying signs, advertisements, and the like, and more particularly to apparatus of this character in the nature of a changeable exhibitor for selecting and displaying any desired one of a series of signs or the like.

The invention contemplates the provision of a display cabinet containing a movable carrier on which is mounted a series of separate sheets or curtains, in rolled up condition, together with means for moving the carrier to bring the different curtains into position to be displayed, and means for unrolling the curtain thus brought into position, so that the information thereon may be displayed to view. Such an arrangement is broadly old.

Among the objects of the present invention are to provide, in display apparatus of the above type, means for selecting any desired one of the curtains and bringing it into position to be displayed; to provide automatic means for first thus moving the carrier, and for thereupon rolling the selected curtain; to provide selecting and operating means of this character controlled electrically from a transmitter located at a remote control station; to provide such an electric control system requiring the use of a single circuit only; to so arrange the apparatus that the momentary closing of a switch at the control station will initiate the operation of the selecting and display mechanism which, having been thus thrown into operation, will proceed automatically to successively perform the several operations; and to provide means for indicating to the operator at the transmitting station that the selected sign or the like has in fact been displayed.

With the above and other objects in view, and to improve generally on the details of such apparatus, the invention consists in the construction and combination of parts hereinafter described and claimed and illustrated, by way of example, in the accompanying drawings, forming part of this specification, and in which:

Fig. 1 is a plan view of one form of transmitting or controlling apparatus;

Fig. 2 is an elevation of one side thereof;

Fig. 3 is an inverted plan view of the same;

Fig. 4 is an elevation of one end thereof;

Fig. 5 is a vertical section on the line 5—5 of Fig. 2, looking in the direction of the arrows;

Fig. 7 is a transverse horizontal section on the line 7—7 of Fig. 2, looking upwardly;

Fig. 8 is a transverse section on the same line, looking downwardly;

Fig. 9 is a fragmentary detailed section on the line 9—9 of Fig. 8, looking in the direction of the arrows;

Fig. 10 is a vertical transverse section substantially on the line 10—10 of Fig. 6, looking in the direction of the arrows;

Fig. 11 is a detailed horizontal section substantially on the line 11—11 of Fig. 10;

Figure 15:
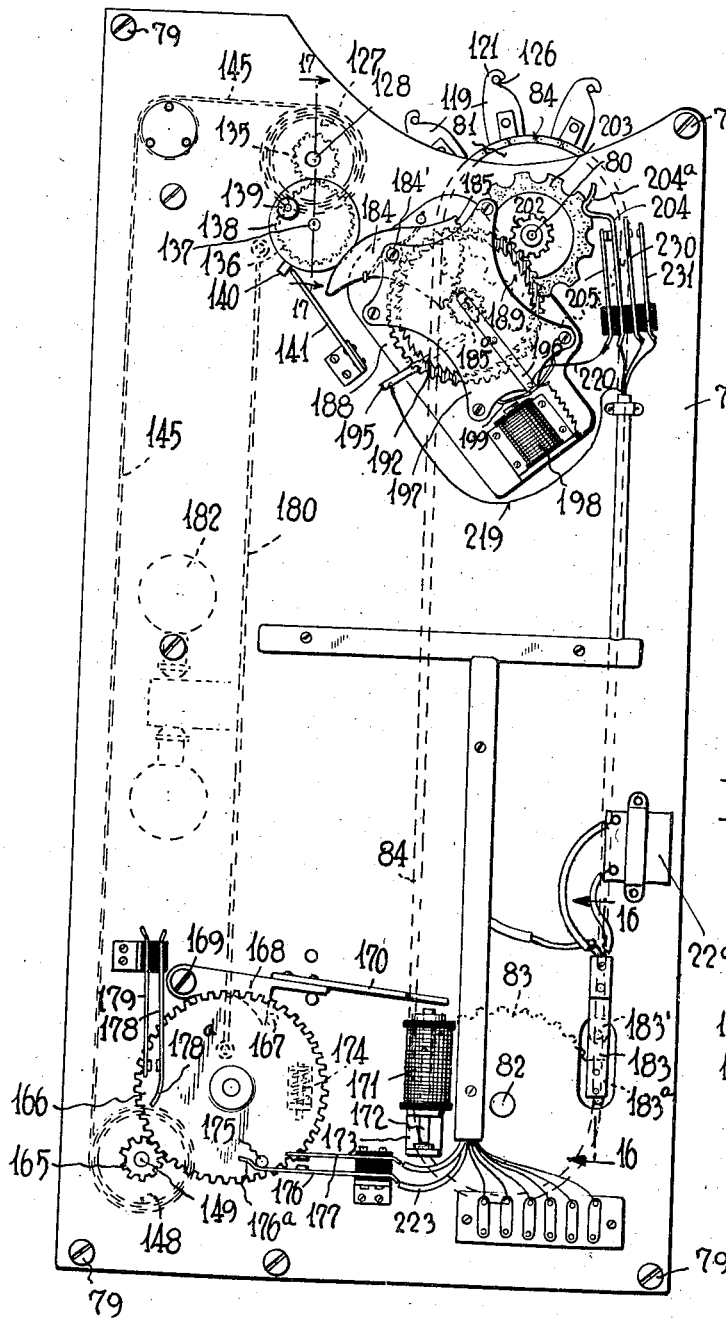
Figure 16:
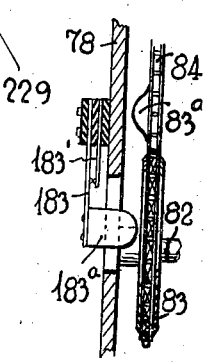
Figure 28:
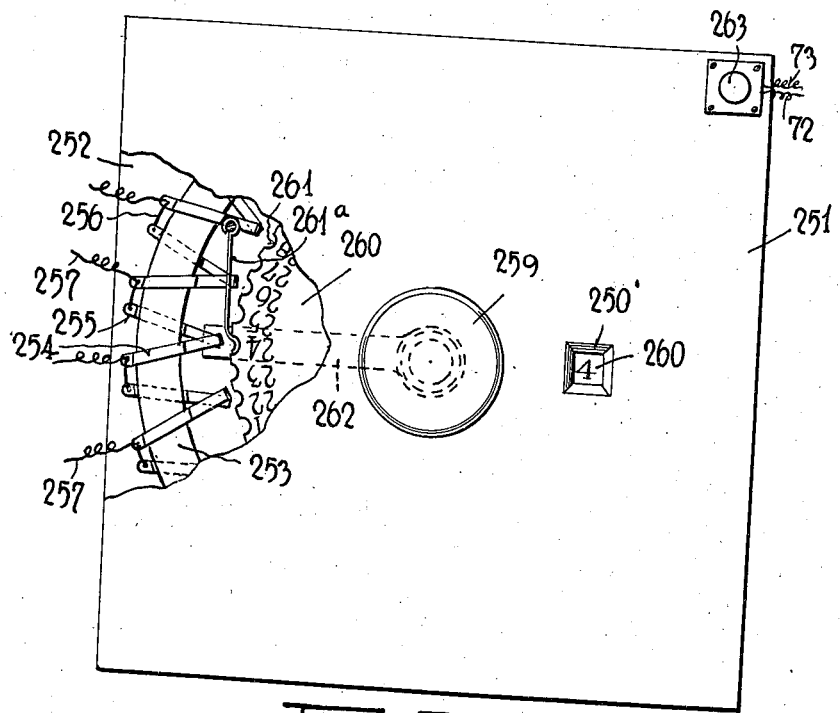
Figure 29:
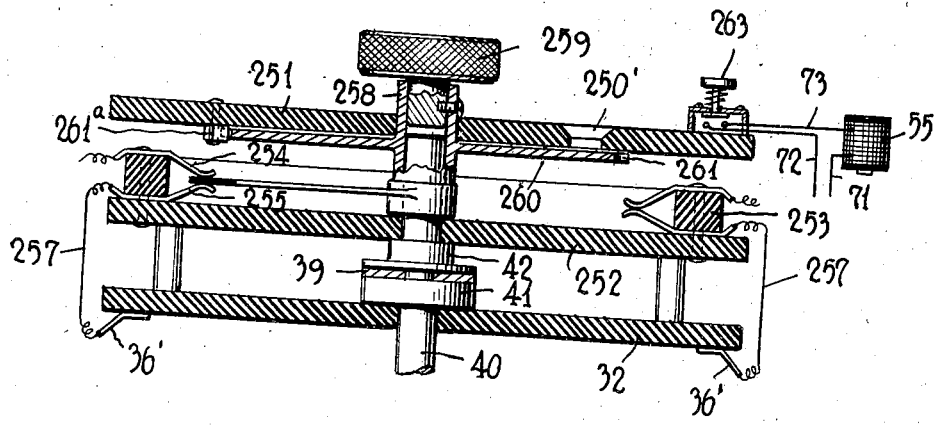

Figs. 12 and 12A together constitute a wiring diagram showing the arrangement of parts of both the transmitting and display apparatus, and the circuit connections employed;

Fig. 12B is a fragmentary view of certain of the parts illustrated in Fig. 12A, but showing such parts in a different relative position;

Fig. 13 is a front elevation of the improved display apparatus, the curtains and associated parts being omitted for the sake of clearness;

Fig. 14 is an elevational view of one side of the display apparatus;

Fig. 15 is an elevational view of the other side thereof;

Fig. 16 is a detailed section on the line 16—16 of Fig. 15, looking in the direction of the arrows;

Fig. 17 is an enlarged fragmentary longitudinal section through the end of one of the rollers illustrated in Figs. 13 and 15, and associated mechanism, parts being shown in elevation;

Fig. 18 is an enlarged detailed elevational view of part of the mechanism shown in Fig. 15;

Fig. 19 is a horizontal section on the line 19—19 of Fig. 18;

Fig. 20 is an elevation of one of the gear wheels shown in Figs. 18 and 19;

Figs. 21 and 22 are vertical sectional views through the center of the display apparatus, parts being omitted for the sake of clearness, these views showing the selected curtain in rolled up and in unrolled position, respectively;

Fig. 23 is a fragmentary enlarged longitudinal section through one of the curtain rolls which is mounted on the movable carrier;

Fig. 24 is an elevation of one end thereof;

Fig. 25 is an elevation of the other end thereof;

Fig. 26 is a transverse section on the line 26—26 of Fig. 23, looking in the direction of the arrows;

Fig. 26A is a section through the transmission gearing shown near the bottom of Fig. 14, illustrating a speed controlled brake;

Fig. 27 is a diagram showing how a plurality of display cabinets can be controlled from a single transmitter; and Figs. 28 and 29 are a plan view and transverse section respectively showing a modified form of transmitter which may be employed.

The invention has special utility when used as a train indicator employed to inform the public as to the location, destination and time of departure of trains leaving a station. Apparatus of this general nature is illustrated in prior Patent No. 2,010,263, dated August 6, 1935, to Job Hutchinson.

The present invention, however, is by no means limited to such use, but is equally applicable for displaying signs or advertisements of any character whatsoever, and also for displaying textile materials such as rugs and the like.

While, therefore, in the following specification and claims the word "curtain" will be used, for simplicity, as referring to the rolled up sheets or webs mounted upon the movable carrier, it will be understood that this term is intended to include flexible material of any nature whatsoever. Also, for simplicity, these rolled up sheets or curtains will be referred to as carrying "signs", but obviously the matter to be displayed by the curtains may consist of pictures, maps, drawings, textile designs, or any other information which it is desired to display to the public.

As stated in the preamble, the improved apparatus constituting the present invention comprises a transmitter or control device, and a display apparatus. These are entirely independent mechanically, and are connected only by the necessary circuit wires. Insofar as possible, and for the sake of clearness, each will be described separately.

The transmitter

The preferred form of transmitter or control apparatus is illustrated in Figs. 1 to 12 of the drawings. It includes a keyboard of the general type used on calculating machines and the like, and comprising a bank of keys or push buttons each having a number displayed on the face thereof.

Referring to the drawings, the improved transmitter comprises an upper plate or table 1 and a lower plate 2 rigidly held in parallel spaced relation by means of posts 3. The lower plate 2 is supported on suitable legs 4 so as to provide a space beneath the same for the mounting of a motor and other necessary devices. The keys or push buttons are designated by the numeral 5, and as shown, each is mounted at the upper end of a thin, flat, vertically extending shank 6 passing freely through the table 1. These keys are arranged in rows, each row being assembled on a mounting strip or plate 7, secured to the under side of the table 1, in which plate the shanks 6 are mounted to reciprocate.

Referring to Fig. 10, each shank, at a point below the plate 7, carries a cam device 8 having an inclined cam surface 9 with a notch 10 arranged above it. Below the cam surface 9, the device is laterally offset and carries a downwardly extending tail piece 11 surrounded by a spring 12. This spring 12 bears at its lower end upon the horizontal portion 14 of a bracket 13, depending from the table 1. Pivotally mounted at its upper edge at 16 in each bracket 13 is a laterally swinging bar 15 having an offset lower edge 17. This edge 17 is adapted to bear against the cam 9, as clearly shown at the right of Fig. 10, so that when any key in that row is depressed, the bar 15 will be caused to swing laterally on its pivots.

Rigidly secured to each bar is a depending arm 18, the lower ends of all of the arms 18 being pivotally connected to a transversely extending bar 19. Near one end, this bar carries a pin 20 which is adapted to engage the lower end of a spring contact 21, mounted at its upper end on a block of insulation 23. When this contact spring 21 is engaged by the pin 20 and moved to the left, as viewed in Fig. 10, it is adapted to engage a second contact spring 22, also mounted on the block 23 (see Fig. 6).

An electromagnet 26 is mounted in a suitable bracket 27 secured to the extended end 1ª of the table 1 and is adapted to operate a swinging armature 25, pivoted at 25ª (see Fig. 11). To this armature is rigidly secured a bracket 24, having a horizontally extending arm 24ª, bifurcated at its end 24ᵇ and adapted to engage over the adjacent arm 18. Thus when the magnet is energized and the armature 25 swung on its pivot, the arm 24ª tends to swing the arm 18 and associated parts toward the left, as viewed in Fig. 10. As hereinafter described, the energization of magnet 26 is controlled by the contacts 21 and 22.

Mounted on and depending from each bracket 14 is a vertically disposed strip 28 of insulating material (see Fig. 10), and on the face of this strip is mounted a series of pairs of contacts 29. To the lower end of the tail piece of each key shank, below the bracket 14, is secured a block of insulating material 30, on which is mounted a resilient contact spring 31, having at its top a pair of spaced, bent over fingers, as shown in Fig. 10, and adapted to engage the contacts 29.

Figure 6:
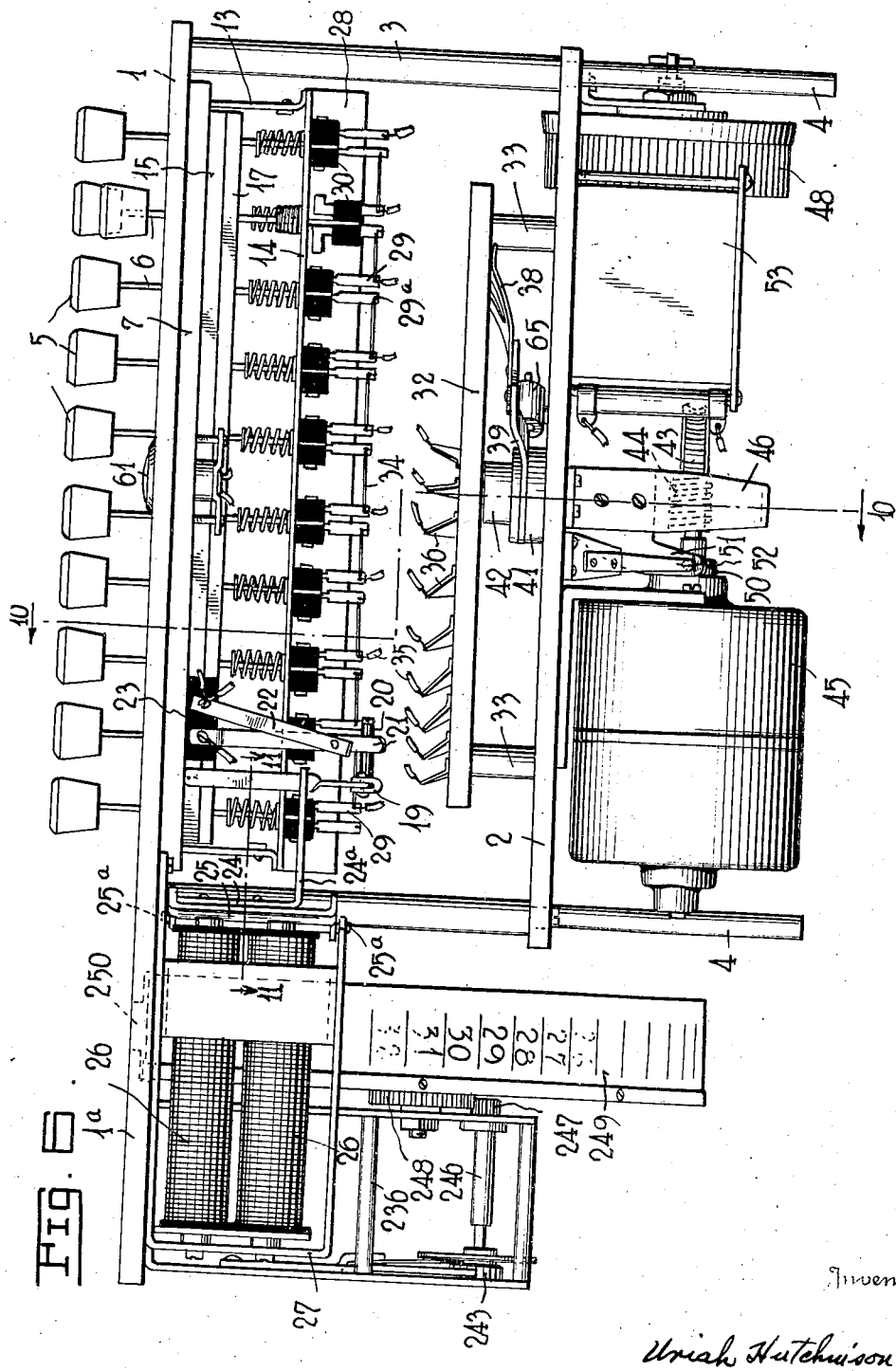
Fig. 6 is an elevation of the other side thereof.

By reference to Fig. 6, it will be seen that one of each pair of contacts 29 is provided at its upper end with a laterally extending or offset portion 29ª. The resilient fingers of contact 31 are so spaced that when the key shank is in its upper or normal position, one of these fingers will engage the contact 29 of a pair and the other finger will engage the extension 29ª of the other contact, thus bridging the pair of contacts. When, however, the key is depressed, as shown near the right in Fig. 6, the finger moves down out of contact with the offset portion 29ª of the contact 29, so that these contacts are no longer bridged. In the diagram of Fig. 12, each pair of contacts is illustrated, for the sake of simplicity and clearness, as comprising a long contact 29 and a short contact 29ª, so that when the contact 31 is depressed, it moves off of the short contact 29ª and thus no longer serves to connect the contacts of the pair.

As clearly shown in Figs. 2 and 6, a plate or table 32 of insulating material, and somewhat smaller than the plate 2, is supported a short distance above the latter by means of posts 33, and on the lower surface of this plate is mounted an arcuate series of contact buttons 37, each button being connected with a terminal 36 at the upper side of the plate. As shown in Fig. 6, the adjacent contacts 29 of each consecutive pair are connected by a conductor 34, and from each pair of contacts thus connected extends a wire 35, to one of the terminals 36. This is also clearly set forth diagrammatically in Fig. 12.

In practice, and as shown in Fig. 7, the contact buttons 37 are preferably arranged in the form of two concentric arcuate series. Adapted to engage and wipe over these contact buttons is a pair of connected spring fingers 38 (see Fig. 8), carried at the end of an arm 39, secured to a shaft 40, and positioned thereon by means of collars 41 and 42. This shaft passes downwardly through the plate 2 and carries at its lower end a worm wheel 43, meshing with a worm 44, secured to the shaft of an electric motor 45, mounted on the under side of the plate 2. A contact spring 46 engages the lower end of the shaft 40, as best shown in Figs. 3 and 10, and is mounted on a suitable bracket 47. A suitable rheostat 48 (Figs. 2 and 3) may be employed for controlling the speed of the motor and a resistance 49 is preferably connected in series with the motor, as shown in Fig. 12.

On the shaft of motor 45 is secured a cam 50, adapted to strike against and move the curved end of a spring contact 51, which in turn is adapted to engage a second contact 52. A condenser 53 is preferably connected across these contacts so as to prevent sparking.

Also mounted at the lower side of the plate 2 is an electromagnet 55, having an armature 56 carried by a spring strip 57 mounted to engage a contact 58. An adjustable insulated back stop 59 is carried by a curved bracket 60, and adapted to engage the other side of the spring strip 57, as shown in Figs. 3 and 10.

A pilot lamp 61 is preferably mounted in the table 1 for the purpose of indicating to the operator when the apparatus is energized.

Referring now more particularly to Figs. 8 and 9, it will be seen that beneath the plate 2, I also mount a spring contact 62 and a second contact 63, arranged to cooperate therewith. The spring contact 62 carries a pin 64 projecting freely through the plate 2 and having a rounded end adapted to be engaged by a cylindrical portion 65 of insulating material formed at the end of a second arm or lever 66, also rigidly carried by the shaft 40. When the portion 65 of this arm sweeps over the pin 64, it will depress the pin and force the contacts 62 and 63 into engagement.

As clearly shown in Fig. 12, a pair of conductors 67 connects the contacts 62 and 63 with the terminals of the winding of magnet 55, and a wire 68 (which is in practice attached to the spring finger 46) connects the shaft 40 with the contacts 51, which is operated by the cam on the shaft of motor 45. A second wire 69 extends from the other contact 51 to the display apparatus, as shown in Figs. 12 and 12A. In these figures, 70 and 71 designate the positive and negative supply leads respectively, for furnishing current to operate the apparatus, but it will be noted that apart from these supply leads, the wire 69 constitutes the sole connection between the transmitter and the display apparatus, for controlling the latter from the former. In practice, it of course is not necessary for the supply leads 70 and 71 to extend from the transmitter to the display apparatus, as shown in the drawings, since each of these devices may be plugged in to a suitable source of supply at the respective stations, provided both sources of supply are fed from the same generating system.

A wire 72 connects the positive supply lead through the contacts 21 and 22 with one side of the magnet 26, the other side of which is connected by wire 73 with one terminal of magnet 55, while the other terminal of this magnet is connected through resistance 49 and wire 74 with one side of the motor 45, the other side of which is connected by wire 75 to the negative lead. A wire 76 also extends from the contact 29ª of the first pair of key controlled contacts to the negative lead. The pilot 61 is connected between one terminal of the magnet 55 and the negative lead.

The display apparatus

Referring now to Figs. 13 to 26, inclusive, the display apparatus comprises a cabinet having side walls 77 and 78 (see Fig. 13) connected by tie rods 79. A shaft 80 is journalled in the side walls 77 and 78 near the upper end thereof and has secured thereto, inside of said walls, a pair of spaced sprocket wheels 81.

A second shaft 82 is similarly journalled near the lower end of the cabinet, and carries a pair of similarly spaced sprocket wheels 83. A pair of sprocket chains 84 passes around the respective pairs of sprocket wheels 81 and 83, as indicated in Figs. 14, 15, 21 and 22.

A gear wheel 85 is also secured to the shaft 80, outside of the cabinet, and meshes with a pinion 86, mounted on a stub shaft and rigid with a sprocket wheel 87, around which runs a sprocket chain 88, engaging a sprocket pinion 89, journalled on a stub shaft rigidly spaced from the shaft on which the sprocket wheel 87 is mounted by a brace 90. Rigid with the sprocket pinion 89 is a brake wheel 91, engaged by a brake band 92 in the form of a strap, anchored at one end, as at 93, and connected at its other end with a lug 94 projecting from the frame of a motor 100, this lug 94 being connected by a spring 95 to one end 96 of a bracket 97, pivoted to the wall 77 of the cabinet at 98, and formed with an arcuate slot 99 in which works a set screw, by means of which the angular position of the bracket, and thus the tension of the spring 95 may be varied, as desired.

The motor 100, above referred to, is clearly shown in Fig. 13 and is illustrated as pivotally mounted at 101 in a bracket 102 secured to the wall 77 of the cabinet. This wall has an opening 77ª through which passes the lug 94, above mentioned, and also the shaft of the motor, on which is mounted a friction pulley 106. An electromagnet 103 is rigidly mounted on the motor frame 100, and is adapted to attract an armature 104 pivoted at one end to the motor frame and secured at its other end to one end of a spring 105, the other end of which is anchored to the cabinet.

As hereinafter described, the magnet 103 is connected in series with the motor 100, and when energized, attracts its armature. This serves to rock the motor 100 on its pivots 101 and to resiliently press the friction pulley 106 down upon the wheel 91. At the same time, the tilting movement of the motor moves the lug 94 downwardly against the tension of the spring 95, thus relieving the tension on the brake band 92 and permitting the wheel 91 to turn. Thus the same movement of the motor releases the brake and simultaneously applies a friction drive to the wheel 91. This, in turn, through the pinion 89, chain 88, sprocket 87, pinion 86 and gear 85 drives the shaft 80, carrying the sprocket wheels 81.

To one of the sprocket chains 84 is secured a series of spaced brackets 107 (see Figs. 23 and 26), each bracket having a notch 108 in the outer end thereof and having a laterally extending portion 109 at the inner end thereof. To the chain adjacent each bracket 107 is also secured an oppositely directed bracket 110 to the free end of which is rigidly attached one end of a leaf spring 112, having an opening 113 near the other end thereof.

To the other chain 84 is secured a series of similarly spaced brackets 114, each having a circular opening 115 therein.

Mounted in the brackets 107 and 114, secured to the chains 84, are a series of spring rollers on which are wound the curtains to be displayed. Each of these spring rollers, as shown in Figs. 23 and 24, comprises a central shaft 116, one end 117 of which fits in the opening 115 in the bracket 114, while the opening 113 in the spring 112 slips over the other end 116 thereof. Secured to the shaft adjacent the end 116 thereof is a grooved collar 118 which fits within the notch 108 in the bracket 107, this collar preventing longitudinal displacement of the shaft and roller relative to the brackets.

Adjacent the collar 118 is a polygonal nut 118a, both of these parts being rigid with the shaft. Adjacent the ends of the shaft are end plates 119 and 120, these plates being of the shape shown in Figs. 24 and 25. The plate 119 fits over the nut 118a and is thus locked to the shaft, while the plate 120 is also rigidly secured to the shaft. The inner end of the plate 119 has a notch 119a into which extends the projection 109 carried by the bracket 107. Thus the plate 119 is rigidly locked both to the shaft and to the bracket 107, with the result that both the plate and the shaft are held against rotation.

Mounted to rotate freely on the shaft between the plates 119 and 120 is a roller 122, preferably comprising a hollow cylindrical body, having mounted in each end thereof a flanged end disc 123 provided with a central boss or hub journalled on the shaft. Encircling the shaft within the hollow roller is a helical spring 124, anchored at one end 124a to the shaft and at the other end 124b to the hub of the roller. Thus there is provided a spring controlled roller mounted for free rotation on the shaft between the plates 119, 120.

Wound on this roller is a curtain 125 containing the matter to be displayed. This curtain carries at its free end a transversely extending rod 126, the ends of which extend beyond the side edges of the curtain and are adapted to be received in hooks 121 formed at the outer ends of the side plates 119 and 120, as clearly shown in Figs. 24 and 25.

Referring now to Figs. 21 and 22, it will be seen that there are provided a series of the rollers above described mounted on the pair of sprocket chains 84 in spaced parallel relation, these chains, together with their brackets and associated parts, constituting a carrier for the rolled up curtains.

Mounted in the upper part of the cabinet between the walls 77 and 78 thereof, and parallel with the curtain rollers just described, is another spring roller 127. This may be similar in construction to the curtain rollers and preferably comprises a hollow cylindrical body, into the ends of which are fitted flanged discs 129, having hub portions journalled on a shaft 128. (See Fig. 17.) Surrounding the shaft 128 within the roller 127 is a helical spring 130, anchored at one end 131 to the shaft and at the other end 132 to the hub of the end disc of the roller. Thus the roller is free to turn upon the shaft but is spring controlled.

Still referring to Fig. 17, it will be seen that a pinion 135 is freely journalled on the shaft 128. This pinion has a pawl and ratchet connection with the disc 129. A convenient way of doing this would be to pivotally mount on the disc a pawl arranged to engage a tooth or notch on the hub of the pinion, after the manner of an ordinary shade roller catch. As shown in the drawings, however, another method is illustrated, namely, the inside of the flange of the disc is provided with teeth 133, which are engaged by a pawl 134 pivotally mounted on the hub of pinion 135. This pinion meshes with a gear 136, secured to the shaft 137, journalled in the wall 78 of the cabinet, and having secured to its outer end a disc 138, on the outer face of which is mounted, near its periphery, a roller 139.

Referring now to Fig. 15, it will be seen that there is set into the periphery of this disc 138, a radially projecting screw or pin 140, displaced a suitable angular distance from the roller 139 and adapted to snap by and engage the end of a resilient stop or catch 141.

Secured to the opposite end of shaft 128 from the gear 135 is a notched disc 142, and a toothed wheel 143, the latter adapted to be engaged by a spring pressed pawl mounted on the wall 77 of the cabinet. By applying a suitable wrench to the notched disc 142, the shaft 128 may be rotated so as to wind up the spring 130 to any desired extent, the shaft being held in adjusted position by means of the pawl 144. It will be understood that, except for this turning for winding the spring, the shaft 128 is stationary.

Referring again to Fig. 21, it will be seen that there is secured to and wound upon the roller 127, a sheet or web 145, which, for the sake of clearness, will be called an apron. This apron passes from the roller 127 over an idler or guide roller 147 and has its end secured to a third roller 148 fixed on a shaft 149 journalled in the walls of the cabinet.

Secured to the apron 145 at a suitable point in its length are a pair of hooks 146 adapted to engage the rod 126 of each of the curtain rollers, the hooks 146 being spaced apart in accordance with and adapted to pass through openings 125a formed in the end of the curtain 125 (see Fig. 23). It will be understood that the arrangement of the parts is such that when one of the curtain rollers reaches the position designated A in Fig. 21, the rod 126 thereof is in just the proper position to be engaged by the hooks 146 as the apron 145 is unrolled, and to lift the rod 126 out of the hooks 121 and carry the curtain along with it so as to unroll it. Fig. 21 shows the position of the parts during operation of the machine and just before the apron 145 is unrolled, while Fig. 22 shows the position of the parts after such apron has been unrolled and wound upon the roller 148. In this position, it will be seen that the hooks 146 have moved down into a position adjacent the roller 148, and that the curtain has been unrolled from the roller 122 of the carrier and has been extended in display position between the rollers 147 and 148, the curtain being superimposed upon the apron throughout the entire distance between the rollers 127 and 148. When the curtain is thus unrolled, the spring 124 inside of the roller 122 is wound more tightly, after the manner of an ordinary shade roller, and the spring 130, inside the roller 127, is also wound up and placed under greater tension. The apron 145 itself remains at all times stretched across the display opening between the rollers 147 and 148, both during the selection of a curtain as shown in Fig. 21, and after the curtain has been selected and unrolled, as shown in Fig. 22. This is the normal position of the parts, and when it is not desired to display any legend, a blank opaque curtain is preferably provided which may be unrolled into the position shown in Fig. 22 by pressing the corresponding "blank" button.

On one end of the shaft 149, preferably outside of the cabinet, is secured a gear 150 (see Fig. 14). This meshes with a pinion 151 rigid with a second gear 152, which in turn meshes with a gear 153 rigid with a friction wheel 154. On the shaft 153ª, carrying the friction wheel 154, is secured a disc 154ª (Fig. 13) on which is pivotally mounted a centrifugally operated brake shoe 154ᵇ, (Fig. 26A), restrained at its free end by a spring 154ᶜ, and adapted to engage a fixed brake drum 154', carried by one of the plates 155. The purpose of this centrifugal brake is to control the speed of the apron 145 when unwinding from the roller 148, as hereinafter more fully explained. The gearing comprising the elements 151 to 154, inclusive, is mounted between a pair of spaced plates 155 (see Fig. 13), secured to the wall of the cabinet. A friction pulley 156 is adapted to engage the friction wheel 154 and is secured on the shaft of an electric motor 157, projecting through an opening in the wall of the cabinet, and pivotally mounted at 158 in a bracket 159. A spring 161 is connected between a fixed support and an outwardly projecting lug 160 (Fig. 13) carried by the motor 157. This spring normally tends to hold the friction gearing out of engagement. Rigidly mounted on the motor 157 is an electromagnet 162, having an armature 163 pivotally mounted on the motor at one end and connected at its other end with a spring 164, which is relatively stronger than the spring 161. As will hereinafter appear, the magnet 162 is in series with the motor 157, and when energized, it attracts its armature, rocking the motor on its pivot 158 and forcing the friction pulley 156 into engagement with the friction wheel 154. The motor being energized at the same time serves, through the chain of gearing described, to drive the roller 148 and thus wind the apron on this roller, as above mentioned.

At the end of shaft 149, opposite to that at which the above mentioned gearing is located, said shaft carries a pinion 165 (Figs. 13 to 15), which pinion meshes with a gear 166. From the rear side of this gear projects a pin 167, normally engaging a stop lever 168, pivoted at 169 and having secured thereto an extension 170 which projects in the path of the movable core 172 of a solenoid 171. This core normally rests in its lowermost position on a bracket 173. Behind the gear 166 (Fig. 15) is a resilient buffer 174, serving as a stop against which the pin 167 comes to rest under certain conditions.

Projecting from the face of the gear 166 is another pin 175, adapted to engage the projecting end 176ª of a spring contact 176, adapted to cooperate with another contact 177, said contacts being normally held out of engagement by the pin 175, as shown in Fig. 15.

Also arranged adjacent the gear 166, and in position to be engaged by the pin 175, are a pair of spring contacts 178 and 179, the former having a curved end 178ª, as shown in Fig. 15. As the gear 166 revolves, the pin 175 moves the contact 178 into engagement with the contact 179, as shown in Fig. 12B.

Vertically disposed within the cabinet and disposed in a plane extending substantially through the gear 166 and roller 127 is a reflector plate 180, and between this plate and the apron 145 is disposed a group of lamps 182, all as shown in dotted lines in Fig. 15, such lamps being supported on a cross bar 181, as illustrated in Fig. 13. Current to these lamps is controlled by a switch comprising a pair of spring contacts 183 and 183' (Fig. 16), the contact 183 being extended and carrying at its free end a lug 183ª which passes freely through an opening in the wall 78 of the cabinet. A pin 83ª, carried by one of the sprocket chains 84, is adapted to engage the lug 183ª under certain conditions and open the circuit to the lamps. This is preferably arranged so that it will occur when the apparatus is not in operation and the sprocket chain 84 stops in such a position that the "blank" curtain appears at the display opening.

The apron itself preferably comprises two sections, namely, the lower section which momentarily extends between the rollers 147 and 148, as shown in Fig. 21, when the desired curtain is being selected, this section being preferably opaque, and an upper section on which the curtains 125 are superposed, which upper section is preferably transparent or translucent. The curtains themselves may be either opaque with transparent or translucent letters or designs, or they may be transparent or translucent, with opaque letters or designs. In either case, light from the lamps 182 shines through the superposed transparent section of the apron and the curtain, when in the display position shown in Fig. 22, thus brightly illuminating the curtain by transmitted light.

In case the curtains consist of textile material or similar opaque sheets, they may be illuminated by reflected light by means of lamps arranged in front of the display position (not shown).

Referring now to Figs. 13, 15 and 18 to 20, the selector mechanism, by which any desired curtain may be selected and displayed, will now be described, such mechanism being mounted between and carried by a pair of plates 188 and 197, held in spaced parallel relation, the plate 188 being formed of insulating material, as shown in Fig. 19, and secured to the wall of the cabinet.

A rocking member or lever 184 is pivotally mounted upon a shaft 184' and is formed at the upper edge near one end with a curved cam surface 184ª, and at the opposite end with an arcuate toothed rack 185. A spring 186 is coiled around the shaft 184' and bears at one end, 186ª, against the edge of the lever 184, and is anchored at its other end, 186ᵇ, to a fixed support. The tension of this spring is exerted in such a direction that it normally tends to swing the lever 184 clockwise, as viewed in Fig. 18.

The rack 185 meshes with a pinion 185ª rigid with a relatively large ratchet wheel 189, both mounted to turn freely on a stub shaft 187.

To the rear side of the ratchet wheel 189 is secured a resilient brush or wiper 190, the free end of which is positioned to ride upon a disc 191 of insulating material, said disc being rigidly secured to a gear 192, also mounted to revolve freely upon the stub shaft 187, but the gear is held out of contact with said shaft by the disc 191. To the disc 191 is secured a metal plate 193, having a radially extending strip 193ª embedded in the rim of the disc 191 and flush with the surface thereof, the plate 193 also having a resilient tail piece 194 projecting through an opening in the disc and bearing against the gear 192. Thus the contact strip 193ª is electrically connected with the gear 192. Against the rear side of the gear 192 bears a resilient finger or brush 195, which serves to complete the electric circuit, as hereinafter described.

In order to establish electrical connection with the ratchet wheel 189 and wiper brush 190, a contact strip 196 bears upon the end of shaft 187 (see Figs. 15 and 19).

Also mounted on the plate 188 is an electromagnet 198 having an armature 199 pivoted at 200 and controlled by a spring 201. The ends of this armature extend on both sides of the pivot and are bent upwardly at an angle to each other so as to constitute pallets adapted to engage the teeth of the ratchet wheel 189. At each oscillation of the armature 199, these pallets permit the ratchet wheel to turn through a distance of one tooth, thus constituting an escapement. It will, of course, be understood that the ratchet wheel is caused to turn by reason of the tension of the spring 186 exerted thereon through the pinion 185a.

The gear 192 meshes with a pinion 202 rigidly secured to the shaft 80. Also secured to this shaft is a disc 203, having a series of rounded notches in its periphery, and against this disc bears a contact spring 204, having a rounded end 204a adapted to snap into and out of the notches as the disc revolves. The contact 204 cooperates with a second contact 205, and moves into and out of engagement therewith as each notch passes under the end of contact 204.

Referring now to Figs. 13 and 14, relay mechanism is mounted on the wall 77 of the cabinet and comprises a magnet 206 having a pivoted armature 206a mechanically connected with but electrically insulated from a contact strip 207, the free end of which is arranged to play between a pair of spaced contacts 209 and 210. A pivoted spring pressed latch 208 is arranged to engage the free end of armature 206a when the same is pulled down by the magnet 206, and a second magnet 211 is arranged to attract and release this latch, when required.

Referring to Fig. 12A, it will be seen that wires 213 and 214 connect the positive lead 70 with one side of the magnet 206, and with the contact finger 207, while a wire 215 connects the contact 210 with one side of the solenoid 171, the other side of which is connected through wire 223 with the negative side of the line. A wire 212 connects the other side of magnet 206 with one side of magnet 198, the other side of magnet 198 being connected with the control wire 69 extending from the transmitter. Thus the magnets 198 and 206 are connected in series.

Wires 216 and 217 extend from wire 215 to and through the magnet 103 and motor 100, the other side of the motor being connected with the negative lead 71 by wires 218 and 219. Current is supplied to the motor 100 over this circuit, and the circuit is controlled by the contacts 178 and 179. A wire 225 extends from the contact 209 to and through magnet 162 and its associated motor 157, and a wire 224 connects the other side of this motor with the contact 177. Current to the motor 157 is supplied over this circuit, which circuit is controlled by the contacts 176, 177. In order to avoid sparking, condensers 227 and 228 are preferably connected across the associated pairs of contacts, and a condenser 229 is connected across the switch 183. The lamps 182 are supplied with current over wires 226, connected with the positive and negative leads respectively.

*Operation*

Without attempting to explain the circuit connections in any greater detail, it is thought that the circuits can be more logically traced in connection with the following description of the operation of the system as a whole.

It will be understood that the numbers appearing on the keys 5 of the transmitter correspond to the various curtains mounted on the movable carrier in the display cabinet, and that the operator is provided with an index identifying these curtains by number. The key designated "B" in Fig. 1 corresponds with the above mentioned blank curtain.

This key B corresponds to the No. 44 position, that is to say, when depressed, it serves to send out the largest number of impulses of which the transmitter is capable, namely, in the arrangement shown, forty-four impulses.

If we assume that this key has been depressed, the blank curtain would have been drawn down into position across the display opening, as shown in Fig. 22, and the contact segment 193a would have been moved through the pinion 202 and gear 192 to a position at the lower side of this gear directly over the magnet 198 in Fig. 18 and immediately under and in contact with the spring wiper 190. In Fig. 18, this spring finger or wiper 190 is shown in its normal or starting position, to which position it is automatically returned after each operation, as hereinafter described.

Let it now be assumed that it is desired to display curtain number 4. All the operator does is to depress button number 4. By reference to Fig. 10, it will be seen that depression of this button does two things. First, the cam 9 bearing against the edge 17 of the plate 15 rocks it on its pivot, thus through the arm 18 shifting the bar 19 and pin 20 to the left, thus momentarily bringing contacts 21 and 22 into engagement. At the same time, the contact member 31 moves downwardly and, as shown at the right hand side of Fig. 6, moves off of the extension 29a, and thus removes the bridge between the pair of contacts 29.

By reference to Fig. 12, it will be seen that closing of the circuit at contacts 21 and 22 serves to energize the magnet 26 over circuit wires 72 and 73 and through magnet 55, wire 74, motor 45 and wire 75, to the other side of the line. This causes the magnet 26 to attract its armature and to kick the arm 18 still further to the left, as shown in Fig. 11, thus assisting the key in completing its stroke, and releasing the previously depressed key. In this way the operation is made easier and more positive and certain. The contacts 21, 22 open when the pressure of the operator's finger is removed from the key.

The passage of current through the magnet 55, as described, causes it to attract its armature and to close the circuit at contacts 57, 58. This short circuits the magnet 26 and associated contacts, so that, although the contacts 21, 22 are closed only momentarily, as pointed out, the magnet 55 serves to maintain its own circuit through wires 73 and 74 and the motor 45, as above described. At the same time, the pilot lamp 61 is lighted.

The motor 45, being connected in series with the magnet 55, now begins to run, and at each revolution thereof, it engages the end of contact spring 51 and momentarily closes the normally open circuit at contacts 51, 52. Thus at each revolution of the motor, these contacts are closed for an instant, thereby sending electrical impulses out over the control line 69. The control circuit, however, also includes the wire 68 and the wiper 38. It will be noted that this wiper is normally out of engagement with the contact buttons 37, and consequently during the first few revolutions of the motor, the control circuit is open and no impulses are actually sent. As soon, however, as the wiper 38 engages the first contact button 37, the circuit through wire 68 is completed through the wiper 38, button 37, and wires 35 and 76, to the negative side of the line.

For the sake of simplicity in Fig. 12, the contact buttons 37 are shown as arranged in a single arcuate series, instead of the double series illustrated in some of the other figures. The effect is, however, the same. In either case, the wiper 38 is preferably so shaped that it engages only one contact button at any given instant. At the moment of engagement, the circuit is closed at contacts 51, 52, and an impulse sent out through wire 68, as described. The circuit is open at contacts 51, 52, while the wiper 38 passes from one button to the next.

When the wiper 38 passes off of the first button 37, the direct connection with wire 76 is interrupted, and when it engages the second button, the circuit has to pass therefrom through wire 35 and through the first pair of contacts 29 and 29ª, bridged by the element 31. As the wiper 38 passes off of successive buttons 37, the integrity of the circuit is maintained through successive wires 35 and through additional pairs of contacts 29, 29ª and additional elements 31, connected in series through wires 34. This continues until the wiper 38 passes off of the fourth button. Since the fourth key 5 is depressed as shown, the element 31 no longer bridges the contacts 29 and 29ª, and the series circuit through these pairs of contacts above described is interrupted at this point.

The gearing between the motor 45 and arm 39 may be such that one revolution of the motor drives the arm a distance corresponding with the space between two buttons 37, or some even fraction of this distance. Assuming that one revolution of the motor corresponds with the space between successive contact buttons, it will be seen that during the time that the wiper was travelling over the first four buttons, the control circuit was made and broken at contacts 51, 52 four times, or in other words, four impulses were impressed upon that circuit. After these four impulses were transmitted, the circuit was interrupted at the fourth key, as described. The pairs of contacts 29 associated with all of the keys in all of the rows being connected in series, as indicated, it will be understood that the position of the depressed key in this circuit determines the number of impulses which are transmitted to the display apparatus. Thus the mere depression of any desired one of the keys serves to predetermine the exact number of impulses which will be transmitted, and serves at the same time to momentarily close the starting switch at contacts 21, 22 to initiate the operation of the apparatus.

After the wiper 38 has passed the particular button 37, associated with the depressed key, and the control circuit thus interrupted, the motor 45 continues to run and the arm 39 continues to sweep idly over the remaining buttons 37, this movement continuing until the cylindrical member 65 at the end of arm 66 engages the pin 64 and forces the contacts 62 and 63 together. The closing of these contacts results, as will be seen, in short circuiting the magnet 55 over wires 67. This deenergizes the magnet 55, causing it to drop its armature 57 and open the motor circuit at contact 58, thereby stopping the motor. Thus the motor and the arms 39 and 66 always come to rest, after each operation, in the position shown in Fig. 12, that is to say, in the zero position in which the wiper 38 is not in engagement with any contact button.

Referring now to Fig. 12ᴬ in connection with Fig. 12, it will be seen that the complete circuit through the control wire 69 can be traced from the positive lead 70, wires 214 and 213, magnet 206, wire 212, magnet 198, control wire 69, contacts 51 and 52, wire 68, wiper 38, buttons 37 and wire 76 back to the negative lead.

Therefore, the first impulse which passes through this circuit upon the engagement of the wiper 38 with the first button 37, energizes magnet 206. This magnet pulls down its armature 206ª and moves the finger 207 out of engagement with contact 209 and into engagement with contact 210. Current then passes from wire 213 through finger 207, contact 210, wire 215, solenoid 171, and wire 223 to the negative side of the line. The solenoid 171 is thus immediately energized and pulls up its core 172. This core strikes the extension 170 of lever 168 and swings it upward, thus moving the shoulder thereon out of the path of pin 167.

At the end of the previous operation, the selected curtain having been unrolled into display position, as shown in Fig. 22, remained in this position, and was held there, against the tension of spring 130 in roller 127, by reason of the engagement of the pin 167 with the lever 168. As soon as this pin is thus disengaged, therefore, the tension on spring 130 causes the roller 127 to revolve and to begin to wind up the apron 145 on roller 127 and unwind it from roller 148. The turning of roller 148 drives gear 166 through pinion 165 and finally brings it into the position shown in Fig. 12ᴮ. In this position, the pin 167 comes to rest against the resilient stop or buffer 174, and the pin 175, having moved away from spring contact 176 and allowed this contact to engage contact 177, has now engaged contact 178 and forced it against contact 179, thus closing the circuit at that point. The closing of the circuit at contacts 176 and 177 through the motor 157, has no effect at this time, because this motor circuit has to be completed through wire 225 and is open at contact 209.

The closing of the circuit at contacts 178 and 179, however, results in energizing motor 100 over a circuit including the wire 213, finger 207, contact 210, wires 215 and 216, contacts 178 and 179, wire 217, magnet 103 and motor 100, and wires 218 and 219 to the negative lead 71.

Thus the motor 100 is set in operation to drive the carrier, but this, it will be noted, does not take place until after the previously displayed curtain has been entirely rewound upon its roller 122, and the apron 145 and associated parts restored to the position shown in Fig. 21.

During the movement of the preceding curtain to display position, the pinion 135, driven through the pawl and ratchet mechanism 133 and 134 (see Fig. 17), had rotated the disc 138 (Fig. 15) in a clockwise direction and had caused the roller 139 thereon to engage the curved edge of the lever 184 and swing that lever to its extreme position, as shown in Figs. 15 and 18, thus placing the spring 186 under tension and rotating the ratchet wheel 189 in a clockwise direction to the zero or starting position shown in Fig. 18. The ratchet wheel was held in that position by means of the pallet 199.

The disc 138 continued to revolve until the stop pin 140 snapped past the resilient catch 141 and came to rest against the end thereof, as shown in Fig. 15, the travel of the curtain and the gearing ratio being such that the pin reaches this position at substantially the same time that the curtain reaches full display position and comes to rest. When the auxiliary or display motor 157 had completed its operation, and was disengaged from the friction wheel through which it drives the roller 148, the tension of spring 130 within the roller 127 served to maintain the stop pin 140 firmly against the end of catch 141. In this position of the disc 138, it will be observed that the roller 139 is entirely out of the path of movement of the lever 184 as it swings back under the influence of the spring 186, as permitted by the escapement.

During the return movement of the curtain, immediately following the release of the gear 166 by the solenoid 171, as described, the pawl 134 rides idly over the ratchet 133 and the disc 138 is not moved. Thus, owing to this ratchet mechanism, the disc 138 is returned intermittently by the roller 127 but always in the same direction.

As above described, the first impulse coming over the control circuit 69 energizes the magnet 206 and the solenoid 171, thus restoring the previously displayed curtain to normal position, and thereupon the motor 100 is automatically set in operation to drive the carrier chains to bring the new selected curtain into position to be unrolled.

The armature 206a of magnet 206 having been pulled down by the first impulse, is locked by the latch 208, so that successive impulses have no effect upon it. Each impulse, however, serves to energize the magnet 198 of the selector mechanism, and to cause this magnet to oscillate its armature 199. As this armature oscillates, the ratchet wheel 189 turns under the influence of wound up spring 186, step by step, in a counter clockwise direction, carrying the spring brush 190 with it. The number of teeth on this ratchet wheel correspond with the number of curtains on the carrier and if, therefore, as has been assumed, it was desired to display curtain number 4, and accordingly four impulses are sent over the control circuit 69, the contact brush 190 will be displaced a distance equal to four teeth of the ratchet wheel, and will then come to rest.

Meanwhile, the motor 100 has been driving the carrier and, through the pinion 202, has been turning the gear 192 in a counter-clockwise direction and shifting the position of the contact strip 193a relative to the ratchet wheel. The carrier will continue to move and the gear 192 continue to turn until the strip 193a is brought into engagement with the brush or wiper 190. When this occurs, a circuit is established from the positive leads 70 through wire 213, contact 210, wires 215 and 216, contacts 178 and 179, wire 222, magnet 211, wire 221, contacts 204 and 205, wire 220, brush 190, contact 193a, brush 195 and wire 219, to the negative lead 71. This energizes the magnet 211 and pulls back latch 208, releasing the armature 206a, and the spring finger 207 immediately moves up and engages contact 209. This breaks the circuit of motor 100 at contact 210, and instantly establishes the circuit of motor 157 through contact 209. Thus the first motor is stopped and the second one started automatically in quick succession. The motor 100 was stopped by the selector mechanism at such a point that the selected curtain was brought to the position A indicated in Fig. 21, ready to be unrolled. The motor 157 thereupon drives the roller 148, causes the hooks 146 to engage the rod 126 of the curtain, and thereupon draws the apron and superposed curtain down into display position, shown in Fig. 22.

As the curtain was moved down into display position, the roller 139 on disc 138 again engaged the cam surface of lever 184 and swung it on its pivot, so that the rack 185 meshing with pinion 185a turned this pinion, and with it the ratchet wheel 189, in a clockwise direction, back to normal position, thus resetting the contact brush 190 back to the position shown in Fig. 18. The contact segment 193a, however, remains in the position to which it had been shifted, namely, a position displaced in a counter-clockwise direction a distance equal to the space of four teeth from its original position.

The rotation of roller 148, as above described, serves to turn gear 166 in a clockwise direction from the position shown in Fig. 12B to that shown in Fig. 12A or Fig. 15. When it reaches this position, the pin 167 drops in behind the locking lever 168, and the pin 175 engages the contact 176, opening at that point the circut of motor 157 and stopping the same. Thus the parts are ready for a new operation, and the selected curtain remains in display position until the operator depresses another key.

Let it be assumed that it is now desired to display curtain No. 10. The operator depresses key number 10, and this, as above described, serves to send ten impulses out over the control line 69 and through the magnets 198 and 206. The impulses passing through magnet 198 serve to step the ratchet wheel 189 around in a counter-clockwise direction a distance equal to ten teeth. The ratchet wheel carries with it the contact brush or wiper 190, and it will be noted that this brush in moving from its normal position, as shown in Fig. 18, to a position displaced a distance of ten teeth of the ratchet wheel, will pass over and engage the contact segment 193a which remains in the position to which it had been previously set, namely, a position spaced only four teeth from its original position. However, the engagement of the wiper brush 190 with the contact segment 193a as it passes over the same at this point has no effect on the circuit through magnet 211, because the wheel 166 has not yet completed its travel, and contacts 178 and 179 are still open.

The motor 100 being energized as before, moves the curtain carrier, and the pinion 202 drives the gear 192, carrying the contact segment 193a in a counter-clockwise direction. This movement of the gear 192 continues until the contact segment 193a catches up with and engages the wiper brush 190 which had previously been set forward a distance equal to ten teeth. When this engagement takes place, the circuit at 178, 179 having by this time been closed, magnet 211 is energized as above described and the motor 100 stopped. The carrier thus comes to rest with the No. 10 curtain at display position. Thereupon, motor 157 comes into action to unroll the curtain into display position, and at the same time lever 184 is actuated to reset the ratchet wheel and wiper brush 190 back to starting position. The contact segment 193a, however, remains in the No. 10 position to which it had been moved.

Let it now be assumed that it is desired to next display curtain No. 7. The operator depresses the number 7 key and thereupon seven impulses are transmitted through the magnet 198, thus stepping around the ratchet wheel 189 and the contact brush 190 a distance of seven teeth. It will be remembered that contact segment 193a had previously been set to and remained in the No. 10 position. Upon the sending of the impulses through magnets 198 and 206, the motor 100 starts and drives the curtain carrier, which, through pinion 202, drives the gear 192 in a counter-clockwise direction. By reference to Fig. 18, it will now be understood that this travel of the carrier continues until the contact segment 193a makes almost one complete revolution and moves past the normal position until it catches up with and engages the contact brush 190 at the No. 7 position to which it has been set. Thereupon, the circuit is closed through magnet 211, the motor 100 stopped, and the motor 157 started, as above described, to bring the No. 7 curtain into display position.

From the foregoing, it will therefore be seen that the contact brush 190 carried by the ratchet wheel 189, is automatically reset to zero or starting position, after each operation, but that the contact segment 193a, always remains in the position to which it was last moved, until another key is depressed. When the apparatus is placed in operation again by the depression of another key, the contact brush 190 is moved to a new position, and the contact segment 193a is driven always in a counter-clockwise direction until it catches up with and engages the contact brush 190, whether this brush, in its new position, be set at a point either in advance of or behind the previous position of segment 193a.

The curtain carrier likewise moves always in the same direction and continues to travel until the brush and contact segment come into engagement after contacts 178 and 179 are closed, such engagement resulting in stopping the carrier with the selected curtain in display position.

In connection with the foregoing explanation of the operation of the apparatus, it will be understood that it is necessary to have a definite relation between the time required by the transmitter to operate and the time required for the apron 145 to be completely unwound from the roller 148. It is obvious that the time required for the transmitter to send out the maximum number of impulses must be less than that required for the complete upward movement of apron 145, so that a short interval may be provided between the operation of the transmitter and the closing of the contacts 178 and 179, as above pointed out. The speed of the motor 45, driving the transmitter, may be regulated by means of rheostat 48 and the upward movement of the apron 145 is retarded by centrifugal governor or brake, shown in Fig. 26A, and already described. The retarding effect of this brake may be adjusted as desired, in any well known manner. By way of example, the speed of the transmitter may be so set that it requires not more than three seconds to complete the sending out of the maximum number of impulses, while the centrifugal governor may be so adjusted that it requires five seconds for the apron 145 to completely unwind from the roller 148. This, therefore, will provide a safety factor or time interval of two seconds between the two operations, and will insure that no error will occur by reason of engagement of the contact brush 190 with the segment 193a, when the former is being set to a new position in advance of the previous position, as hereinabove described in connection with the selection of curtain No. 10.

The keys are arranged in a well known manner so that the depression of a second key restores the previously depressed key to normal position, owing to the mechanical interlock between the keys.

The selector mechanism employed in connection with the present invention, and above described, is quite similar to that disclosed in Patent No. 2,010,263, issued August 6, 1935, to Job Hutchinson, and the function of the contacts 204, 205 and notched disc 203 is quite similar to corresponding elements shown in Fig. 5 of said patent. The spacing between the notches in the disc 203 correspond with the spacing between the curtains on the carrier so that the circuit is opened and closed at contacts 204, 205, each time a curtain passes display position. So long as the contacts 190 and 193a are out of engagement, the opening and closing of the circuit at contacts 204, 205 is idle. As soon, however, as the elements 190 and 193a come into engagement, the next closing of the circuit at contacts 204, 205 immediately results in tripping the latch 208, as above described.

In other words, the elements 190 and 193a constitute a main governing device and the elements 204 and 205 constitute an auxiliary governing device, as in said prior patent, the result being to insure stopping of the carrier accurately at such a point as to bring the selected curtain into exactly the proper position to be displayed.

Another function of auxiliary contacts 204, 205 is to prevent arcing at the main contacts 190 and 193a. The contacts 204, 205 are so timed as to come into engagement just after the segment 193a has centered itself under wiper 190. Thus, uncertain operation, and initial arcing as these latter elements encounter each other, is avoided.

As mentioned in the preamble, the invention contemplates the provision of means for indicating to the operator, at the remote control station, that the curtain selected by him by the depression of a key, has actually been brought into display position and displayed.

To this end, there is provided, adjacent the disc 203 (Figs. 12A and 15), a second pair of spring contacts 230 and 231, the contact 230 being rigidly connected mechanically with, but insulated from the contact strip 204. As the strip 204 rides into and out of the notches in the disc 203, the contact 230 is moved into and out of engagement with the contact 231 and thus produces a series of electrical impulses in the circuit in which these contacts are connected.

The contact 230 is connected by wires 232 and 214, with the positive lead 70, and the contact 231 is connected by wire 233 with a magnet 234, at the control station (Fig. 12), the other side of this magnet being connected with the negative lead 71. Thus as the disc 203 revolves to bring the selected curtain into display position, an impulse is sent over the circuit just traced and the magnet 234 energizes each time a notch in the disc 203 passes the contact 204, that is to say, the magnet 234 is energized once as each curtain passes display position, as the carrier travels.

Referring now to Figs. 2, 3 and 5, it will be seen that this magnet 234 is mounted in a suitable bracket 235 under an extension 1a of the table 1, this bracket comprising a pair of plates rigidly held in spaced relation by tie rods 236.

The magnet 234 is provided with a rocking armature pivoted at 238 and rigid with a plate 237, having an upwardly extending tail piece 239 controlled by a spring 240, and being shaped at its lower end to form a pair of spaced pallets 242. These are adapted to engage a toothed escapement wheel 243, mounted on a shaft 246. Also secured to this shaft is a disc 244 having a series of depressions in one face thereof, and a spring finger 245, secured to the bracket 235, is arranged with its free end bearing upon the disc 244, such free end being formed with a rounded projection adapted to snap into the depression in the disc 244, as the disc revolves, step by step, driven by the escapement mechanism. This serves to cause the shaft 246 to move through a definite angle at each actuation of the escapement mechanism.

Mounted on the inner end of shaft 246 is a pinion 247 meshing with a gear 248, rigid with an indicator drum 249, rotatably mounted on a pivot pin carried by the bracket 235. The indicator drum carries on its periphery a series of numbers corresponding to the numbers on the keys 5, and these numbers are visible through a sight opening 250, formed in the table 1.

From the foregoing, it will be understood that the gearing ratio is such that the drum 249 is moved a distance equal to the space between consecutive numbers at each step of the escapement mechanism, that is to say, at each energization of the magnet 234.

If, as in the preceding example, it be assumed that curtain number 4 was selected for display, then the movement of curtain number 4 to display position will result in four notches of the disc 203 passing under the spring contact 204, and in four impulses being transmitted to the magnet 234. Consequently, the indicator drum 249 will be moved around four steps, so as to bring the numeral 4 into view under the sight opening 250. Thus by observing the number brought into registry with this sight opening, the operator is informed that the curtain corresponding with that number has actually been moved into display position.

It will be understood that by means of the notched disc 203 and contact spring 204, (Fig. 15), operating contacts 230 and 231, as described, the indicator drum 249 is synchronized with the curtain carrier. Thus when, in the preceding example, the curtain carrier moves forward a distance of six notches beyond its previous position, to bring curtain No. 10 into display position, six impulses are sent out over the line 233 and through magnet 234, to move the indicator drum 249 around six more steps, so as to bring the numeral 10 into view under the sight opening.

The display apparatus above described is capable of being so arranged that any one of a plurality of display cabinets, located at different places, can be controlled by a single transmitter at the control station. This is illustrated in Fig. 27, in which 1 designates the transmitter and 5 the keys, as before. Also, as in the previous diagram, 69 designates the control circuit extending from the transmitter.

A, B, C, etc. designate display cabinets located at different positions, and 69ª, 69ᵇ, 69ᶜ, etc. designate branch circuits extending from the main control wire 69 to the respective display cabinets.

Each of these branch circuits is controlled by an individual switch, 5ª, 5ᵇ, 5ᶜ, etc. These switches may conveniently be of the same character as those illustrated diagrammatically in Fig. 12, that is to say, each comprises a pair of contacts 29 and 29ª adapted to be bridged by an element carried by the key. It will be observed, however, that in the present diagram, the relative position of the contact 29ª is reversed, that is to say, it is normally in such a position that the pair of contacts are not bridged by the key element.

From the foregoing, it will be obvious that by depressing any desired one of the keys controlling these switches, the operator may connect the control wire 69 with any desired one of the display cabinets A, B, C, etc. The details of the circuits for each of these cabinets would, of course, be as illustrated in Figs. 12 and 12ᴀ, the positive and negative leads being omitted from Fig. 27, for the sake of clearness.

The keys 5ª, 5ᵇ, etc. may either be mounted separately, or may consist of certain other keys comprised in the regular keyboard of the transmitter.

While the transmitter above described is desirable because of the fact that but a single operation, namely, the depression of a key, is required to select the desired curtain, and to simultaneously initiate the operation of the display apparatus, it is entirely possible to employ other forms of transmitter, for sending out the necessary number of impulses, and for initiating the operation of the display apparatus. One such modified arrangement of transmitter is illustrated in Figs. 28 and 29.

Referring to these figures, the parts corresponding to those previously described are given the same reference characters. A plate or table 251 is provided with a sight opening 250'. The same plate 32 is also employed as before, but above this is arranged a third plate 252. On this plate 252 is mounted a ring 253 of insulating material and arranged around this ring is an annular series of pairs of substantially radially extending contacts. The upper contacts 254 of each pair are mounted on the ring, while the lower contacts 255 of each pair are secured beneath the ring. The inner ends of these contacts are bent toward each other and are normally in engagement, as shown at the right in Fig. 29.

The upper contact of each pair is connected with the lower contact of the adjacent pair by means of a wire 256 (Fig. 28), and each of the pair of contacts thus connected is itself connected by a wire 257 to a terminal 36', these terminals 36' being mounted on the lower face of plate 32 and arranged in an annular series, corresponding with the contacts 254 and 255.

Contact buttons (not shown) similar to the buttons 37 in Fig. 7, are connected with the terminals 36' and embedded in the upper surface of the plate 32, and the wiper 38 carried by arm 39 is adapted to sweep over these contacts, as before. In other words, the arrangement of wiper and contact buttons is identical with that shown in Figs. 2, 6, 7 and 8, except that the buttons and wiper are disposed on the upper side of the plate 32 instead of on the lower side thereof. The wiper arm 39 is driven by the motor through shaft 40, as before. In order to select and predetermine the number of impulses sent out by the transmitter, however, instead of employing a keyboard as before, there is loosely mounted on the upper end of shaft 40 a sleeve 258, to the upper end of which is secured a knob 259. Immediately below the plate 251, and rigid with the sleeve 258 is an indicator disc 260, carrying a series of numbers successively visible through the sight opening 250'. Also rigidly carried by the sleeve 258, at a point just above the plate 252, is an arm 262, the end portion at least of which is formed of insulating material. The edge of the disc 260 is preferably provided with notches 261, as shown, into which snaps the rounded end of a spring finger 261ª, so that as the disc is turned, it is momentarily brought to rest by the spring finger entering a notch, each time the arm 262 passes between a pair of contacts.

Associated with the apparatus just described and preferably mounted on the plate 251 is a push button switch 263, adapted, when depressed, to close the circuit between wires 72 and 73, and thus momentarily energize the magnet 55. This magnet is the same in function and operation as the similarly numbered magnet shown in Fig. 12, and is provided with the same armature and associated parts (not shown) for the purpose of controlling the circuit of motor 45. The same circuit breaker 51, 52 and the same control wires 68 and 69, shown in Fig. 12, are, of course, contemplated in connection with Fig. 29.

In using this form of transmitter, the operator grasps the knob 259 and turns it until the number corresponding to the desired curtain to be selected appears at the sight opening 250'. As the knob 259 is turned, the arm 262, which is suitably bevelled at its end, passes successively between the individual members 254 and 255 of the annular series of contacts, and when it rests between any two contacts, such as illustrated in the drawings, the circuit at those contacts is interrupted.

It will, of course, be understood that the control circuit through wire 68 and contact buttons passes in series through all of the pairs of contacts 254 and 255, these pairs being connected by wires 256, as described, just as in Fig. 12 the control circuit passes in series through all of the pairs of contacts 29 and 29ª. Thus, in Figs. 28 and 29, as in Fig. 12, when the wiper reaches the contact button connected to the particular pair of contacts at which the circuit is interrupted, the sending of impulses over the control circuit is stopped.

Thus the operation of the transmitter, shown in Figs. 28 and 29, is similar in general to that illustrated in the preceding figures, the chief difference being that in the preceding figures, only a single act is necessary to set the apparatus for a predetermined number of impulses and to simultaneously initiate its operation, whereas, in this latter modification, it is first necessary to turn the knob 259 to select and determine the number of impulses to be sent, and then to press the button 263 to initiate the operation of the apparatus.

What I claim is:

1. Display apparatus comprising a movable carrier, a series of rolled up curtains mounted on said carrier in spaced, parallel relation, means for selecting in advance any individual curtain which it is desired to display, and automatic means set in operation by actuation of said selecting means for first moving said carrier to bring the selected curtain into position to be displayed, and thereupon unrolling said curtain to display the same.

2. Display apparatus comprising a movable carrier, a series of rolled up curtains mounted on said carrier in spaced, parallel relation, manually operated means for selecting in advance any individual curtain which it is desired to display, and automatic means set in operation by the actuation of said manually operated means for first moving said carrier to bring the selected curtain into position to be displayed, and thereupon unrolling said curtain to display the same.

3. Display apparatus comprising a movable carrier, a series of rolled up curtains mounted on said carrier in spaced, parallel relation, a transmitter embodying manually operated, electrically controlled means for selecting in advance any individual curtain which it is desired to display, said transmitter including a starting switch, and automatic means, set in operation by a single actuation of said starting switch for first moving said carrier to bring the selected curtain into position to be displayed, and thereupon unrolling said curtain to display the same.

4. Display apparatus comprising a movable carrier, a series of rolled up curtains mounted on said carrier, manually operated means for selecting in advance any individual curtain which it is desired to display, and automatic means set in operation by the actuation of said selecting means for first moving said carrier to bring the selected curtain into position to be displayed, and then unrolling said curtain to display the same and maintaining it in unrolled condition indefinitely.

5. Display apparatus comprising a movable carrier, a series of rolled up curtains mounted on said carrier, manually operated means for selecting in advance any individual curtain which it is desired to display, and automatic means set in operation by the actuation of said selecting means for first re-rolling the curtain previously displayed; second, moving said carrier to bring the newly selected curtain into position to be displayed; and third, unrolling said selected curtain to display the same and maintaining it in unrolled condition until the next actuation of said manually operated means.

6. Display apparatus comprising a cabinet, a movable carrier therein, a series of rolled up curtains mounted on said carrier, manually operated remote control means for selecting in advance any particular curtain which it is desired to display, and for initiating the operation of the apparatus, a single electric circuit extending between said control means and said cabinet, and automatic means controlled wholly over said circuit and set in operation by a single actuation of said initiating means for first moving said carrier to bring the selected curtain into position to be displayed and then unrolling said curtain to display the same.

7. Display apparatus comprising a movable carrier, a series of rolled up curtains mounted on said carrier, electrically controlled means for selecting in advance any particular curtain which it is desired to display and for initiating the operation of the apparatus, said means including a push-button-operated switch, and means set into operation by a momentary actuation of said switch for first moving said carrier to bring the selected curtain into position to be displayed, and then unrolling said curtain to display the same.

8. In apparatus of the character described, a display cabinet, a series of curtains in rolled up condition stored in said cabinet, electrical control apparatus at a remote station, a circuit connecting said control apparatus and cabinet, said control apparatus comprising means for transmitting over said circuit any desired predetermined number of impulses, means at said cabinet responsive to the number of said impulses, for selecting a particular curtain to be displayed, and automatic means serving, after said selecting means has operated, to first move the selected curtain into position to be displayed, and then to unroll said curtain to display the same.

9. In apparatus of the character described, a display cabinet, a series of curtains in rolled up condition stored in said cabinet, electrical control apparatus at a remote station, a circuit connecting said control apparatus and cabinet, said control apparatus comprising means for transmitting over said circuit any desired predetermined number of impulses, means at said cabinet, responsive to the number of said impulses, for selecting a particular curtain to be displayed, and automatic means at said cabinet, set in operation by the first of said impulses, for successively moving the selected curtain into position to be displayed and then unrolling said curtain to display the same.

10. In apparatus of the character described, a display cabinet, a series of curtains in rolled up condition stored in said cabinet, electrical control apparatus at a remote station, a circuit connecting said control apparatus and cabinet, said control apparatus comprising means for transmitting over said circuit any desired predetermined number of impulses, means at said cabinet, responsive to the number of said impulses, for selecting a particular curtain to be displayed, and automatic means at said cabinet, set in operation by the first of said impulses, for successively re-rolling the curtain previously displayed, moving the newly selected curtain into position to be displayed, and finally unrolling said selected curtain and maintaining it in unrolled condition until the next actuation of said control apparatus.

11. Display apparatus comprising a movable carrier, a series of rolled up curtains mounted on said carrier in spaced, parallel relation, means for selecting in advance any individual curtain which it is desired to display, and automatic means set in operation by actuation of said selecting means for first moving said carrier to bring the selected curtain into position to be displayed, stopping said carrier and holding it in such position, and thereupon unrolling said curtain to display the same.

12. Display apparatus comprising a movable carrier, a series of rolled up curtains mounted on said carrier in spaced, parallel relation, a motor for driving said carrier, means for selecting any individual curtain which it is desired to display and for initiating the operation of said apparatus, a second motor serving to unroll the selected curtain into display position, and automatic means set in operation by the actuation of said initiating means for first energizing said carrier-driving motor to cause it to move the selected curtain into position to be displayed, and then de-energizing and stopping said first motor and energizing said second motor to cause it to unroll said selected curtain.

13. Display apparatus comprising a movable carrier, a series of rolled up curtains mounted on said carrier in spaced, parallel relation, a motor for driving said carrier, means for selecting in advance any individual curtain which it is desired to display, a second motor serving to unroll the selected curtain into display position, a switch movable to either one of two positions to selectively complete the circuit of one of said motors or the other, means for first shifting said switch into position to close the circuit of said carrier-driving motor to cause it to move the selected curtain into position to be displayed, and automatic means for thereupon shifting said switch into position to open said circuit and simultaneously close the circuit of said second motor to cause it to unroll said selected curtain.

14. Display apparatus comprising a cabinet, a movable carrier therein, a series of rolled up curtains mounted on said carrier, manually operated remote control means for selecting in advance any particular curtain which it is desired to display, and for initiating the operation of the apparatus, means for moving the carrier, means for unrolling the selected curtain to display the same, automatic means set in operation by actuation of said remote control means for causing said carrier moving means to operate to bring the selected curtain into position to be displayed, and means operated by said carrier when it reaches such position, to stop the carrier-moving means and thereupon actuate the means for unrolling the selected curtain.

15. Display apparatus comprising an endless curtain-carrier, means for moving said carrier always in the same direction, selector mechanism comprising two concentric rotary members the first of which is driven by said carrier, manually controlled electrically operated means for setting the second member to any desired angular position to select any particular curtain to be displayed, and for initiating the operation of the apparatus, and automatic means controlled by said selector mechanism for stopping said carrier when the selected curtain reaches display position and for thereupon unrolling said curtain to display the same.

16. Display apparatus comprising an endless curtain-carrier, means for moving said carrier always in the same direction, selector mechanism comprising two concentric rotary members the first of which is driven by said carrier, manually operated means for setting the second member to any desired angular position to select any particular curtain to be displayed, and for initiating the operation of the apparatus, automatic means controlled by said selector mechanism for stopping said carrier when the selected curtain reaches display position and for thereupon displaying the same, and automatic means brought into operation after any selected curtain has been displayed, for re-setting said second member of the selector mechanism to its zero position.

17. Display apparatus comprising an endless carrier on which are mounted a series of display elements, means for driving said carrier, selector mechanism comprising two concentric rotary members the first of which is driven by said carrier, manually operated means for successively setting the second member to any desired angular position to successively select any particular elements to be displayed, and for putting the carrier driving means into operation, cooperating contacts carried by said members, automatic means, including a circuit closed by said contacts when in engagement, for stopping said carrier with a selected element in display position, a second pair of normally open contacts in said circuit, and automatic means for closing said second contacts only after said second member of the selector mechanism has fully reached the position to which it is to be set, whereby premature stopping of the carrier, by incidental engagement of the selector contacts during the setting operation of the said second member, is prevented.

18. Display apparatus comprising a movable carrier, a series of rolled up curtains mounted on said carrier in spaced, parallel relation, means for selecting in advance any individual curtain which it is desired to display, a spring roller mounted adjacent said carrier on an axis parallel therewith, an apron wound on said spring roller, and having means to engage the end of a selected curtain, a second roller spaced from the first, and having the end of said apron secured thereto, means for driving said second roller to wind the apron thereon and extend the selected curtain, and at the same time wind up the spring in said spring roller, whereby, when said second roller is released from said driving means it is rotated by said spring as the apron is unwound therefrom and rewound on said spring roller, to return the selected curtain to rolled up position, and centrifugal brake means for retarding the rotation of said second roller as the apron is unwound therefrom.

19. Display apparatus comprising a series of parallel rolled up curtains to be displayed, a pair of spaced rollers mounted on axes parallel with said rolled up curtains, an apron having its respective ends secured to said two rollers, means for rotating said rollers so as to wind said apron from one to the other, means for selecting any desired curtain to be displayed, and means carried by said apron for engaging the end of any selected curtain to unroll and display the same as said apron is wound from one roller to the other.

20. Display apparatus comprising a cabinet having a display opening, a series of rolled up curtains in said cabinet, a pair of parallel rollers in said cabinet disposed one at each side of said display opening, an apron passing around said rollers and extending across said display opening, means for selecting any desired curtain to be displayed, means whereby said apron may engage the selected curtain, and means whereby said apron, after having engaged the selected curtain, is caused to travel across said display opening, carrying said curtain superposed upon it.

21. Display apparatus comprising a movable carrier, a series of rolled up curtains mounted on said carrier in spaced, parallel relation, means for selecting in advance any individual curtain which it is desired to display, a spring roller mounted adjacent said carrier on an axis parallel therewith, a flexible element wound on said spring roller and having means to engage the end of a selected curtain, a second roller spaced from the first, and having the end of said flexible element secured thereto, means for driving said second roller to wind the flexible element thereon and extend the selected curtain, and at the same time wind up the spring in said spring roller, whereby, when said second roller is released from said driving means, it is rotated by said spring, as the flexible element is unwound therefrom and rewound on said spring roller, to return the selected curtain to rolled up position.

22. In apparatus of the character described, a display cabinet, a series of curtains in rolled up condition stored in said cabinet, electrical control apparatus at a remote station, a circuit connecting said control apparatus and cabinet, said control apparatus comprising means for transmitting over said circuit any desired predetermined number of impulses, means at said cabinet, responsive to the number of said impulses, for selecting a particular curtain to be displayed, a motor for moving the selected curtain to display position, and means for unrolling it to display the same, a circuit for said motor normally open at two points, automatic means set in operation by the first of said impulses for closing said motor circuit at one point and re-rolling the previously displayed curtain, and automatic means brought into operation after said previously displayed curtain has been re-rolled for closing said motor circuit at the other point, and thus energizing the same.

23. Display apparatus comprising a movable carrier, a series of rolled up curtains mounted on said carrier in spaced, parallel relation, a motor for driving said carrier, a circuit for said motor having opening and closing means at two different points, means for selecting in advance any individual curtain which it is desired to display, and for closing said circuit at the first point, means for maintaining said circuit open at the second point so long as a selected curtain remains displayed, means operated by the re-rolling to normal position of a previously displayed curtain for closing said circuit at the second point, and thus energizing said motor to move said carrier to bring the newly selected curtain to display position, and means for thereupon unrolling said newly selected curtain to display the same.

24. Display apparatus comprising an endless carrier on which are mounted a series of display elements, means for driving said carrier, selector mechanism comprising two concentric rotary members the first of which is driven by said carrier, manually operated means for successively setting the second member to any desired angular position to successively select any particular elements to be displayed, and for putting the carrier driving means into operation, automatic means controlled by said selector mechanism for stopping said carrier each time a selected element reaches display position, and automatic means, brought into operation after each such stoppage of said carrier, for re-setting the second member of said selector mechanism to zero position.

25. Display apparatus comprising a movable carrier, a series of rolled up curtains mounted on said carrier in spaced, parallel relation, means for selecting in advance any individual curtain which it is desired to display, a spring roller mounted adjacent said carrier on an axis parallel therewith, an apron wound on said spring roller, and having means to engage the end of a selected curtain, a second roller spaced from the first, and having the end of said apron secured thereto, and means for driving said second roller to wind the apron thereon and extend the selected curtain, and at the same time wind up the spring in said spring roller, whereby, when said second roller is released from said driving means it is rotated by said spring as the apron is unwound therefrom and rewound on said spring roller, to return the selected curtain to rolled up position.

26. Display apparatus comprising a series of parallel rolled up curtains to be displayed, a roller mounted on an axis parallel with said rolled up curtains, a flexible apron adapted to be wound on and unwound from said roller, means for selecting any desired curtain to be displayed, means for extending said apron by unwinding the same from said roller, and means whereby the selected curtain is unwound with and superposed upon said apron as the latter is extended.

URIAH HUTCHINSON.

CERTIFICATE OF CORRECTION.

Patent No. 2,185,895. January 2, 1940.

URIAH HUTCHINSON.

It is hereby certified that error appears in the printed specification of the above numbered patent requiring correction as follows: Page 1, first column, line 22-23, for the word "rolling" read unrolling; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.